United States Patent
Kiyama et al.

(10) Patent No.: US 12,418,679 B2
(45) Date of Patent: Sep. 16, 2025

(54) INFORMATION PROCESSING APPARATUS AND METHOD

(71) Applicant: Sony Group Corporation, Tokyo (JP)

(72) Inventors: Yuka Kiyama, Tokyo (JP); Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 135 days.

(21) Appl. No.: 18/041,834

(22) PCT Filed: Sep. 15, 2021

(86) PCT No.: PCT/JP2021/033827
§ 371 (c)(1),
(2) Date: Feb. 16, 2023

(87) PCT Pub. No.: WO2022/070903
PCT Pub. Date: Apr. 7, 2022

(65) Prior Publication Data
US 2023/0300374 A1    Sep. 21, 2023

Related U.S. Application Data

(60) Provisional application No. 63/084,780, filed on Sep. 29, 2020.

(51) Int. Cl.
*H04N 19/597*    (2014.01)
*G06T 17/00*    (2006.01)

(52) U.S. Cl.
CPC .......... *H04N 19/597* (2014.11); *G06T 17/00* (2013.01)

(58) Field of Classification Search
CPC .............................. H04N 19/597; G06T 17/00
See application file for complete search history.

(56) References Cited

U.S. PATENT DOCUMENTS

| | | | |
|---|---|---|---|
| 6,271,854 B1 * | 8/2001 | Light | G06F 3/04815 345/157 |
| 11,627,314 B2 * | 4/2023 | Tourapis | H04N 19/184 375/240.18 |

(Continued)

FOREIGN PATENT DOCUMENTS

| | | |
|---|---|---|
| WO | 2020/116154 A1 | 6/2020 |
| WO | 2020/154206 A1 | 7/2020 |
| WO | 2020/189038 A1 | 9/2020 |

OTHER PUBLICATIONS

International Search Report and Written Opinion mailed on Dec. 7, 2021, received for PCT Application PCT/JP2021/033827, filed on Sep. 15, 2021, 9 pages including English Translation.

Bouazizi et al., "[SD] Basic support for Audio in scene description", Qualcomm Inc., ISO/IEC JTC1/SC29/WG11 MPEG2020/m54852, Aug. 2020, 9 pages.

(Continued)

*Primary Examiner* — Talha M Nawaz
(74) *Attorney, Agent, or Firm* — XSENSUS LLP

(57) ABSTRACT

The present disclosure relates to an information processing apparatus and method capable of suppressing an increase in a load of a reproduction process.

A scene description file that describes a scene of 3D object content is generated, the scene description file including information associated with Media Presentation Description (MPD) that stores metadata of the 3D object content distributed by using Moving Picture Experts Group Dynamic Adaptive Streaming over HTTP (MPEG DASH) and information regarding encoding of Representation included in Adaptation Set in the MPD. Furthermore, the scene description file is analyzed, the 3D object content to be decoded is selected on the basis of the information regarding the encoding of the Representation, and the encoded data of the selected 3D content is decoded. The present disclosure can be applied to, for example, an information processing apparatus, an information processing method, or the like.

20 Claims, 28 Drawing Sheets

(56) References Cited

U.S. PATENT DOCUMENTS

| | | | | |
|---|---|---|---|---|
| 2016/0021355 | A1* | 1/2016 | Alpaslan | H04N 13/161 |
| | | | | 348/43 |
| 2017/0063960 | A1* | 3/2017 | Stockhammer | H04N 21/4621 |
| 2017/0156015 | A1* | 6/2017 | Stockhammer | H04S 3/006 |
| 2017/0366814 | A1* | 12/2017 | Adsumilli | H04N 19/117 |
| 2018/0343468 | A1* | 11/2018 | Harrell | H04N 19/157 |
| 2021/0144190 | A1* | 5/2021 | Amirpour | H04N 19/179 |
| 2021/0209829 | A1* | 7/2021 | Ilola | H04N 21/8146 |
| 2021/0314626 | A1* | 10/2021 | Kammachi Sreedhar | |
| | | | | H04N 21/85406 |
| 2021/0360236 | A1* | 11/2021 | Kirk | G06T 9/001 |
| 2021/0409818 | A1* | 12/2021 | Bouazizi | H04N 21/44012 |
| 2022/0264080 | A1* | 8/2022 | Harviainen | H04N 21/2343 |
| 2022/0295034 | A1* | 9/2022 | Bouazizi | H04N 21/21805 |

OTHER PUBLICATIONS

Bhatia et al., "Khronos gITF2.0", Available Online: https://github.com/KhronosGroup/gITF/tree/master/specification/2.0, Jun. 9, 2017, 111 pages.

"Technologies under Considerations on Support of MPEG Media in Scene Descriptions", N19446, ISO/IEC JTC 1/SC 29/WG 11, Jul. 3, 2020, 27 pages.

Shuai Zhao et al: "[SD] on DASH Dynamic Bitrate Adaptation with Viewport Update", 133. MPEG Meeting; Jan. 11, 2021-Jan. 15, 2021; Online; (Motion Picture Expert Group or ISO/IEC JTC1/SC29/WG11), No. m56094 Jan. 6, 2021 (Jan. 6, 2021).

Yuka Kiyama et al: "(39.1) [SD] Improvement on MPEG _media extension", 132. MPEG Meeting; Oct. 12, 2020-Oct. 16, 2020; Online; (Motion Picture Expert Group or ISO/IEC JTC1/SC29/WG11), No. m55044v2, Oct. 14, 2020 (Oct. 14, 2020), XP030291788.

* cited by examiner

FIG. 3

```
{
 "scenes":[{"name":"Scene 1","nodes":[0,1]},
           {"name":"Scene2","nodes":[2]}],
 "nodes":[{"name":"Node1", "mesh":0, "camera":0, "skin":0},
          {"name":"Node2", "mesh":1, "camera":1, "skin":1},
          {"name":"Node3"}],
 "meshs":[{"primitives": [{
   "attributes": {"NORMAL": 23,"POSITION": 22,"TANGENT": 24, "TEXCOORD_0": 25},
   "indices": 21,"material": 3, "mode": 4}]
  },
  ⋮
 ],
 "cameras":[...],
 "skins" :[...],
 "materials" :[...],
 "textures" :[...],
   ⋮
 "scene": 0
}
```

```
{
 "meshes": [
  {
   "primitives": [
    {
     "attributes": {
      "NORMAL": 23,
      "POSITION": 22,
      "TANGENT": 24,
      "TEXCOORD_0": 25
     },
     "indices": 21,
     "material": 3,
     "mode": 4
    }
   ]
  }
 ]
}
``` accessor IS DESIGNATED FOR EACH VERTEX ATTRIBUTE

FIG. 7

A
```
"buffers": [
  {
    "byteLength":102040,
    "uri":"duck.bin"
  }
]
```

B
```
"bufferViews": [
  {
    "buffer":0,
    "byteLength":25272,
    "byteOffset":0,
    "target":34963  //ELEMENT_ARRAY_BUFFER
                    //(OpenGL MACRO CONSTANT)
  },
  {
    "buffer":0,
    "byteLength":76768,
    "byteOffset":25272,
    "byteStride":32,  //VERTEX ATTRIBUTE DATA
    "target":34962    //ARRAY_BUFFER
                      //(OpenGL MACRO CONSTANT)
  }
]
```

C
```
"accessors": [
  {
    "bufferView":0,
    "byteOffset":0,
    "componentType":5126,  //FLOAT TYPE (OpenGL MACRO CONSTANT)
    "count":2106,          //2106 PIECES OF data
    "type":"VEC3"          //THREE-DIMENSIONAL VECTOR (data type)
  }
]
```

FIG. 8

```
{
  "extensionsUsed": [ "CompareDataExtension" ]
  "extensionsRequired": ["CompareDataExtension"],
  "nodes": [
    {
      "name": "singleNode"
    }
  ],
  "scenes": [
    {
      "name": "singleScene",
      "nodes": [ 0 ],
      "extensions": {
        "CompareDataExtension": { ..... }
      }
    }
  ],
  "scene": 0
}
```

FIG. 10

```
{
"texture":[{"sampler": 0,"source": 1, "extensions": {" MPEG_video_texture ": "accessor": 2}}],
"nodes": [{ "name":"singleNode"}],
"scenes": [{ "name": "singleScene",
          "nodes": [0]}],
"extensions": {
    "MPEG_media":{
    "media":[
        {"name": "source_1" , "renderingRate":30.0, "startTime": 9.0, "timeOffset": 0.0,
        "loop":"true", "controls":"false",
        "alternatives":[{"mimeType":"video/mp4;codecs=Y'avc1.42E01EY'", "uri":"video1.mp4",
              "tracks":[{"track":","#track_ID=1"}]
            }]
        }
      ]
    }
},
"scene": 0
}
```

FIG. 11

```
{
  "accessors": [{"bufferView": 0, "componentType": 5126, "byteOffset": 0,
                 "count": 12323, "type": "VEC4",
    "extensions": {
      "MPEG_timed_accessor": {"bufferView": 1, "updateRate":25.0, "immutable":1,"}
    }
  }],
  "bufferViews":[{"buffer": 0, "byteLength":5555000, "name":" circular_buffer"},
                 {"buffer": 1, "byteLength":128,
                  "name":"timed_accessor_information_header_buffer"}],
  "buffers":[{"byteLength": 5555000,
    "extensions": {
      "MPEG_circular_buffer": { "count":5, "headerLength": 12, "updateRate":25.0}
    }},
    {"byteLength": 128}
  ]
}
```

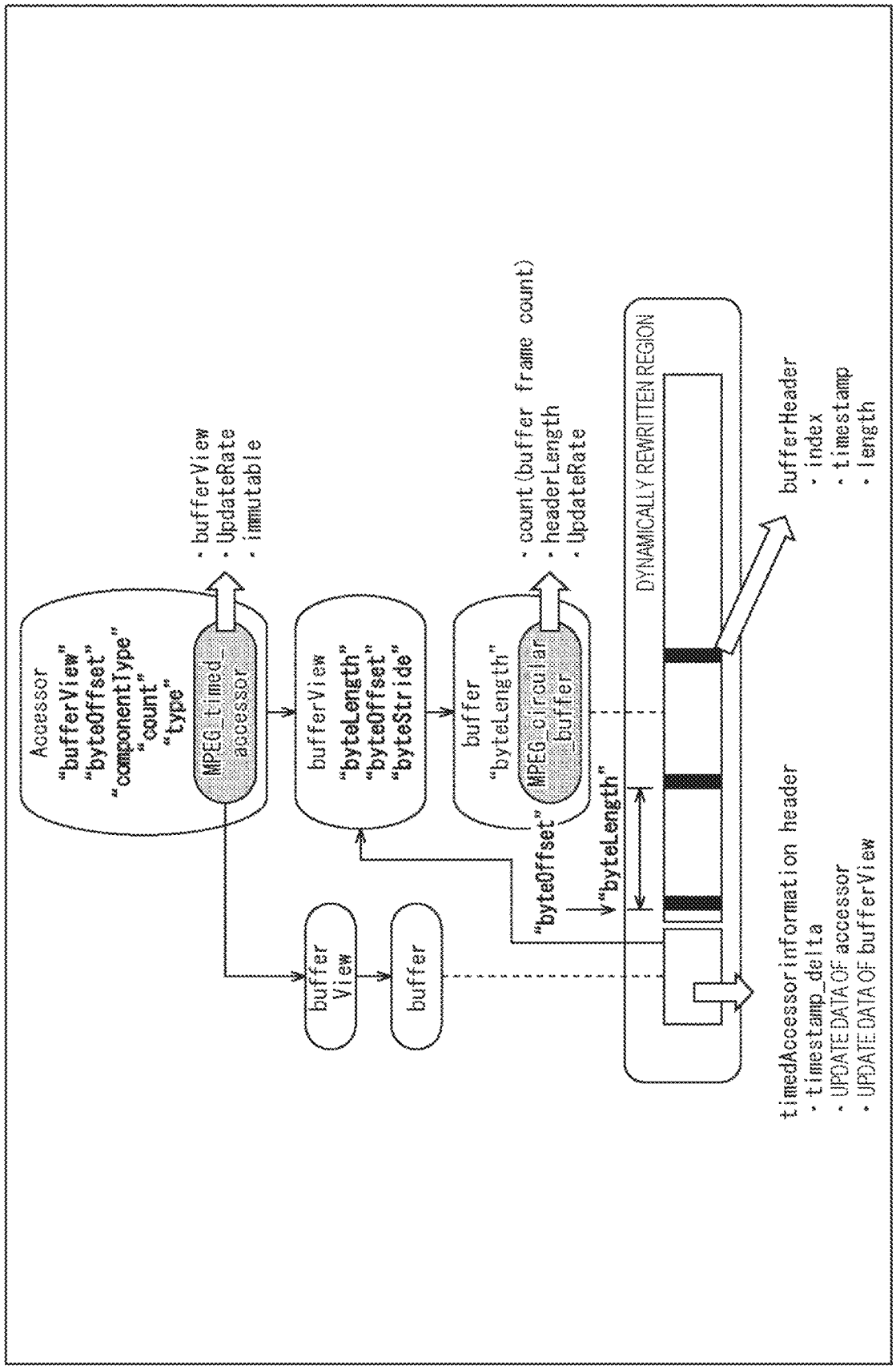

FIG. 14

```
{"extensions":{
"MPEG_media":{
"media":[
{"name":"source_1"
"alternatives":[
{"mimeType":"video/mp4;codecs=\"avc1.42E01E\"",
"uri":"video1.mp4",
"tracks":[{"track":"#track_ID=1"}]
}]
}]
}
}
}
```

FIG. 15

```
{
  "extensions": {
    "MPEG_media":{
      "media":[
        {"name": "source_1"
         "alternatives":[
            {"mimeType":"video/mp4;codecs=\"avc1.42E01E\"",
             "uri":"video1.mp4",
             "tracks":[{"track":"#track_ID=1"}]},         ← 91
            {"mimeType":"video/mp4;codecs=\"avc1.64000d\"",
             "uri":"video2.mp4",
             "tracks":[{"track":"#track_ID=1"}]}          ← 92
         ]}
      ]
    }
  }
}
```

*FIG. 16*

A
```
{
"extensions":{
 "MPEG_media"{
  "media":[
   {"name":"source_1"
    "alternatives":[
     {"mimeType":"video/mp4;codecs=\"avc1.42E01E\"",
      "uri":"video1.mp4",
      "tracks":[{"track":"#track_ID=1"}},
     {"mimeType":"video/mp4;codecs=\"avc1.64000d\"",
      "uri":"video2.mp4",
      "tracks":[{"track":"#track_ID=1"}]}
    ]}
  ]
 }
}
}
```

B
```
{
"extensions":{
 "MPEG_media"{
  "media":[
   {"name":"source_1"
    "alternatives":[
     {"mimeType":"application/dash+xml",
      "uri":"manifest1.mpd",
      "tracks":[{"track":"#track=1"}},
     {"mimeType":"application/dash+xml",
      "uri":"manifest2.mpd",
      "tracks":[{"track":"#track=1"}]}
    ]}
  ]
 }
}
}
```

FIG. 17

| STORE codecs INFORMATION OF representation OF AdaptationSet IN Scene Description | | |
|---|---|---|
| METHOD 1 | STORE SINGLE PIECE OF codecs INFORMATION IN tracks ARRAY | |
| | METHOD 1-1 | STORE DASH profile INFORMATION IN mimetype OF alternatives ARRAY |
| | METHOD 1-2 | STORE DASH profile INFORMATION IN mimetype OF profile_alternatives ARRAY |
| METHOD 2 | STORE PLURALITY OF PIECES OF codecs INFORMATION IN tracks ARRAY | |
| | METHOD 2-1 | STORE MINIMUM VALUE AND MAXIMUM VALUE OF codecs VALUES |
| | METHOD 2-2 | STORE EACH VALUE OF codecs OF representation |

FIG. 18

```
{
  "buffer":[
    {
      "extensions": {
        "MPEG_circular_buffer":{
          "count":5,"headerLength":12,"updateRate":25.0,"source":0 }
      }
    }],
  "extensions": {
    "MPEG_media":{
      "media":[{
        "name": "source_0"
        "alternatives":[
          {"mimeType":"application/dash+xml",
           "uri":"manifest1.mpd",
           "tracks":[{"track":"#track=1","codecs": "avc1.42E01E"}]
          },
          {"mimeType":"application/dash+xml",
           "uri":"manifest2.mpd",
           "tracks":[{"track":"#track=1","codecs": "hev1.1.6.L93.B0"}]
          }
        ]
      }]
    }
  }
}
```

FIG. 19

```
{
  "buffer":[
    {
      "extensions": {
        "MPEG_circular_buffer":{
          "count":5,"headerLength":12,"updateRate":25.0,"source":0 }
      }
    }],
  "extensions": {
    "MPEG_media":{
      "media":[{
        {"name": "source_0"
         "alternatives":[
            { "mimeType":"application/dash+xml;profiles:"urn:mpeg:dash:profile:isoff-live:2011"",
              "uri","manifest1.mpd",
              "tracks":[["track","#track=1","codecs": "avc1.42E01E"]]
            },
            { "mimeType":"application/dash+xml;profiles:"urn:mpeg:dash:profile:isoff-live:2011"",
              "uri","manifest2.mpd",
              "tracks":[["track","#track=1","codecs": "hev1.1.6.L93.B0"]]
            }
         ]
        }
      ]}
    }
  }
}
```

FIG. 20

```
{"extensions": {
  "MPEG_media":{
    "media":[
      { "name": "source_0",
        "alternatives":[
          ("mimeType": "mp4/video",
           "uri","file1.mp4",
           "tracks":[{"track":"#track_ID=1","codecs": "avc1.42E01E"}]},
          ("mimeType": "mp4/video",
           "uri","file2.mp4",
           "tracks":[{"track":"#track_ID=1","codecs": "hev1.1.6.L93.B0"}]}
        ]}
    ]}
}
```

FIG. 21

```
{
  "extensions": {
    "MPEG_media":{
      "media":[
        {"name": "source_0",
         "profile_alternatives": [
           {
             "mimeType":"application/dash+xml;profiles:"urn:peg:dash:profile:isoff-on-demand:2011"",
             "alternatives":[
               {"uri":"manifest1.mpd",
                "tracks":[{"track":"#track=1","codecs": "avc1.42E01E"}]},
               {"uri":"manifest2.mpd",
                "tracks":[{"track":"#track=1","codecs": "hev1.1.6.L93.B0"}]}
             ]
           },
           {
             "mimeType": "application/dash+xml;profiles:"urn:mpeg:dash:profile:isoff-live:2011"",
             "alternatives":[
               {"uri":"manifest1.mpd",
                "tracks":[{"track":"#track=1","codecs": "avc1.42E01E"}]},
               {"uri":"manifest2.mpd",
                "tracks":[{"track":"#track=1","codecs": "hev1.1.6.L93.B0"}]}
             ]
           }
         ]}
      ]}
  }
}
```

FIG. 22

```
{
  "buffer":[
    {
      "extensions": {
        "MPEG_circular_buffer": {
          "count":5,"headerLength":12,"updateRate":25.0,"source":0 }
      }
    }],
  "extensions": {
    "MPEG_media":{
      "media":[{
        "name": "source_0",
        "alternatives":[
          {"mimeType":"application/dash+xml;profiles:"urn:mpeg:dash:profile:isoff-live:2011"",
           "uri":"manifest1.mpd",
           "tracks":[{"track":"#track=1","codecs": "avc1.42E01E avc1.64000d"}]},
          {"mimeType": "application/dash+xml;profiles:"urn:mpeg:dash:profile:isoff-live:2011"",
           "uri":"manifest2.mpd",
           "tracks":[{"track":"#track=1","codecs": "hev1.1.6.L93.B0 hev1.1.6.L153.90"}]}
        ]
      }]
    }
  }
}
```

FIG. 23

```
{
"buffer":[
    {
    "extensions": {
        "MPEG_circular_buffer": {
        "count":5,"headerLength":12,"updateRate":25.0,"source":0 }
        }],
"extensions": {
    "MPEG_media": {
    "media":[{
        {"name": "source_0",
        "alternatives":[
            {"mimeType":"application/dash+xml;profiles:"urn:mpeg:dash:profile:isoff-live:2011"",
            "uri":"manifest1.mpd",
            "tracks":[{"track","#track=1","codecs": "avc1.42E01E avc1.640028 avc1.640030"}]},
            {"mimeType":"application/dash+xml;profiles:"urn:mpeg:dash:profile:isoff-live:2011"",
            "uri":"manifest2.mpd",
            "tracks":[{"track":"#track=1","codecs": "hev1.1.6.L93.B0 hev1.1.6.L120.90 hev1.1.6.L153.90"}]}
        ]
        }]
    }}
}
```

INFORMATION PROCESSING APPARATUS AND METHOD

CROSS-REFERENCE TO RELATED APPLICATIONS

The present application is based on PCT filing PCT/JP2021/033827, filed Sep. 15, 2021, which claims priority from U.S. Provisional Patent Application No. 63/084,780, filed Sep. 29, 2020, the entire contents of each are incorporated herein by reference.

TECHNICAL FIELD

The present disclosure relates to an information processing apparatus and method, and more particularly, to an information processing apparatus and method capable of suppressing an increase in a load of a reproduction process.

BACKGROUND ART

Conventionally, there is The GL Transmission Format (glTF) (registered trademark) 2.0 which is a format for disposing a three-dimensional (3D) object in a three-dimensional space (for example, refer to Non-Patent Document 1). In recent years, in Moving Picture Experts Group (MPEG)-I Scene Description, it has been studied to extend glTF 2.0 and to apply it to timed media as 3D object content (for example, refer to Non-Patent Document 2 and Non-Patent Document 3). Furthermore, in the MPEG-I Scene Description, it has been also studied that an encoding method, a profile, a level, or the like of the 3D object content can be switched according to the performance of a client or the like.

CITATION LIST

Non-Patent Patent

Non-Patent Document 1: Saurabh Bhatia, Patrick Cozzi, Alexey Knyazev, Tony Parisi, "Khronos glTF2.0", https://github.com/KhronosGroup/glTF/tree/master/specification/2.0, Jun. 9, 2017

Non-Patent Document 2: "Technologies under Considerations on Support of MPEG Media in Scene Descriptions", N19446, ISO/IEC JTC1/SC29/WG11, 2020-07-03

Non-Patent Document 3: Imed Bouazizi, Thomas Stockhammer, "[SD] Basic support for Audio in scene description", ISO/IEC JTC1/SC29/WG11 MPEG2020/m54852, August 2020, Online

SUMMARY OF THE INVENTION

Problems to be Solved by the Invention

However, in a case where a file including 3D object content is distributed by using Moving Picture Experts Group Dynamic Adaptive Streaming over Hypertext Transfer Protocol (HTTP) (MPEG DASH), information for selecting the 3D object content is not stored in a scene description. Therefore, in order to obtain information for selecting the 3D object content, it is necessary to obtain and analyze a media presentation description (MPD). Therefore, there is a possibility that a load of a reproduction process of the 3D object content increases.

The present disclosure has been made in view of such circumstances, and an object thereof is to suppress an increase in a load of a reproduction process.

Solutions to Problems

According to an aspect of the present technology, there is provided an information processing apparatus including a file generation unit that generates a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and information regarding encoding of a Representation included in an Adaptation Set in the MPD.

According to an aspect of the present technology, there is provided an information processing method including generating a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and information regarding encoding of a Representation included in an Adaptation Set in the MPD.

According to another aspect of the present technology, there is provided an information processing apparatus including a selection unit that analyze a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and selects the 3D object content to be decoded on the basis of information included in the scene description file and regarding encoding of a Representation included in an Adaptation Set in the MPD, the information being included in the scene description file; and a decoding unit that decodes encoded data of the 3D object content selected by the selection unit.

According to another aspect of the present technology, there is provided an information processing method including analyzing a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and selecting the 3D object content to be decoded on the basis of information included in the scene description file and regarding encoding of a Representation included in an Adaptation Set in the MPD; and decoding encoded data of the selected 3D object content.

In an information processing apparatus and method according to an aspect of the present technology, a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and information regarding encoding of a Representation included in an Adaptation Set in the MPD, is generated.

In an information processing apparatus and method according to another aspect of the present technology, a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), is analyzed, the 3D object content to be decoded is selected on the basis of information included in the scene description file and regarding encoding of a Representation included in an Adaptation Set in the MPD, and encoded data of the selected 3D object content is decoded.

BRIEF DESCRIPTION OF DRAWINGS

FIG. 3 is a diagram illustrating a description example of a JSON format file.

FIG. 5 is a diagram illustrating a description example of a JSON format file.

FIG. 7 is a diagram illustrating description examples of a buffer object, a buffer view object, and an accessor object.

FIG. 8 is a diagram for describing a method of extending glTF 2.0.

FIG. 10 is a diagram for describing extension for handling timed media.

FIG. 11 is a diagram for describing extension for handling timed media.

FIG. 12 is a diagram for describing extension for handling timed media.

FIG. 14 is a diagram illustrating a description example of MPEG_media extension.

FIG. 15 is a diagram illustrating a description example of an alternative array.

FIG. 16 is a diagram illustrating a description example of MPEG_media extension.

FIG. 17 is a diagram for describing a method of transmitting codecs information of Representation.

FIG. 18 is a diagram illustrating a description example of MPEG_media extension.

FIG. 19 is a diagram illustrating a description example of MPEG_media extension.

FIG. 20 is a diagram illustrating a description example of MPEG_media extension.

FIG. 21 is a diagram illustrating a description example of MPEG_media extension.

FIG. 22 is a diagram illustrating a description example of MPEG_media extension.

FIG. 23 is a diagram illustrating a description example of MPEG_media extension.

MODE FOR CARRYING OUT THE INVENTION

Hereinafter, modes for carrying out the present disclosure (hereinafter, referred to as embodiments) will be described. Note that the description will be made in the following order.
1. MPEG-I Scene Description
2. Transmission of codecs information or the like of Representation
3. First embodiment (file generation apparatus)
4. Second Embodiment (Client apparatus)
5. Appendix

1. MPEG-I SCENE DESCRIPTION

Documents Supporting Technical Contents and Technical Terms

The scope disclosed in the present technology includes not only the contents described in the embodiments but also the contents described in the following non-patent documents and the like known at the time of filing, the contents of other documents referred to in the following non-patent documents, and the like.

Non-Patent Document 1: (described above)
Non-Patent Document 2: (described above)
Non-Patent Document 3: (described above)

That is, the contents described in the above-described non-patent documents, the contents of other documents referred to in the above non-patent documents, and the like are also grounds for determining the support requirement.
<gltf2.0>

Figure 1:
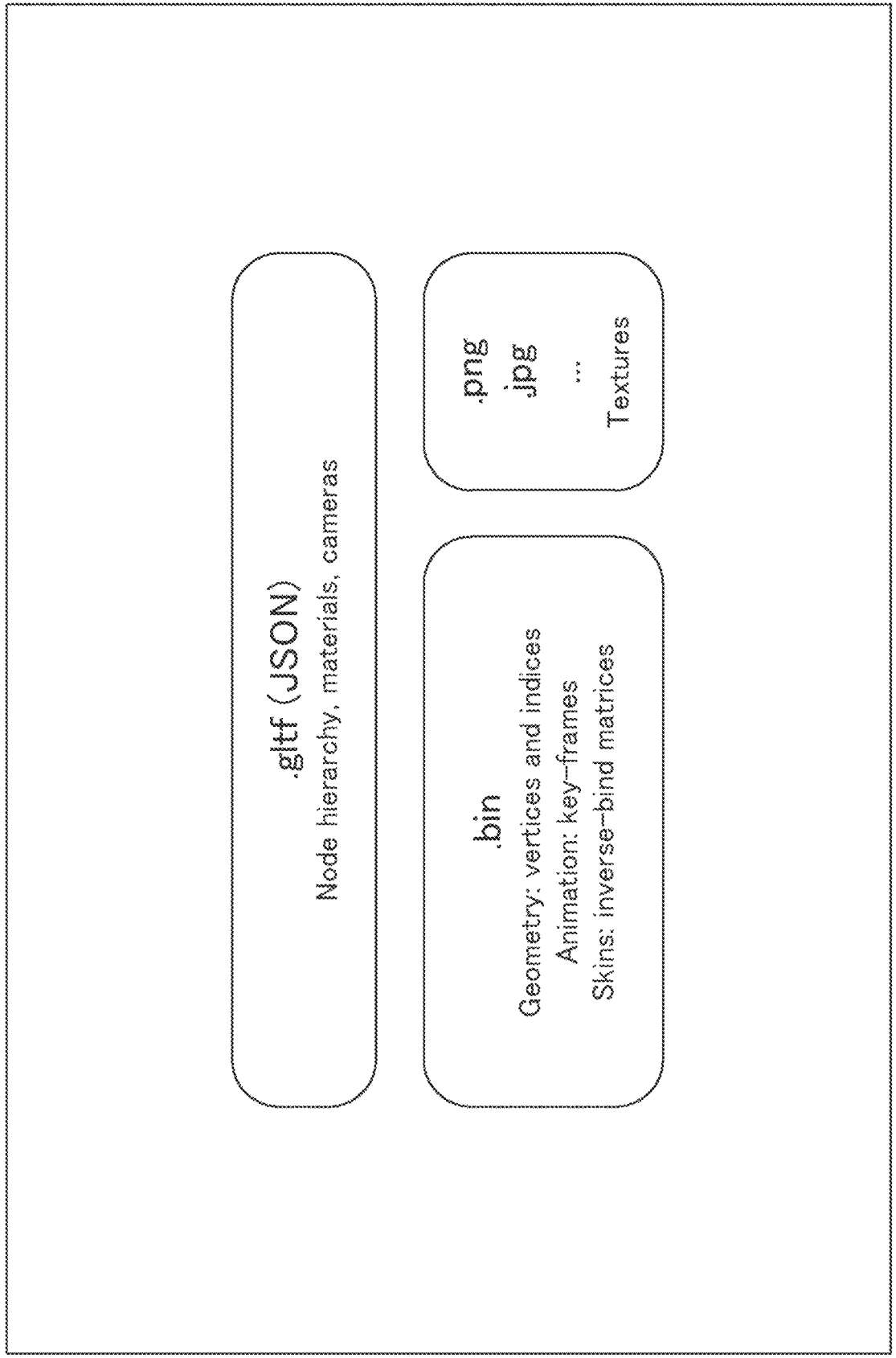
FIG. 1 is a diagram illustrating a main configuration example of glTF 2.0.

Conventionally, for example, as disclosed in Non-Patent Document 1, there is The GL Transmission Format (glTF) (registered trademark) 2.0 which is a format for disposing a three-dimensional (3D) object in a three-dimensional space. For example, as illustrated in FIG. 1, glTF 2.0 includes a JSON format file (.glTF), a binary file (.bin), and an image file (.png, .jpg, or the like). The binary file stores binary data such as geometry and animation. The image file stores data such as texture.

The JSON format file is a scene description file described in JavaScript (registered trademark) Object Notation (JSON). Scene description is metadata describing (explanation of) a scene of 3D content. The description in the scene description defines what kind of scene the scene is. The scene description file is a file that stores such a scene description. In the present disclosure, the scene description file is also referred to as a scene description file.

The description of the JSON format file includes a list of pairs of a key (KEY) and a value (VALUE). An example of the format will be described below.

"KEY": "VALUE"

The key includes a character string. The value includes a numerical value, a character string, a true/false value, an array, an object, null, or the like.

Furthermore, a plurality of key value pairs ("KEY": "VALUE") can be combined by using { } (braces). An object put together in braces will also be referred to as a JSON object. An example of the format will be described below.

"user":{"id":1, "name":"tanaka" }

In this example, a JSON object in which a pair of "id":1 and a pair of "name":"tanaka" are put together is defined as a value corresponding to a key (user).

Furthermore, zero or more values can be arranged by using [ ] (square brackets). This array will also be referred to as a JSON array. For example, a JSON object may be applied as an element of this JSON array. An example of the format will be described below.

```
test":["hoge", "fuga", "bar"]
"users":[{"id":1,
"name":"tanaka"}, {"id":2, "name":"yamada"}, {"id":3,
"name": sato"}]
```

Figure 2:
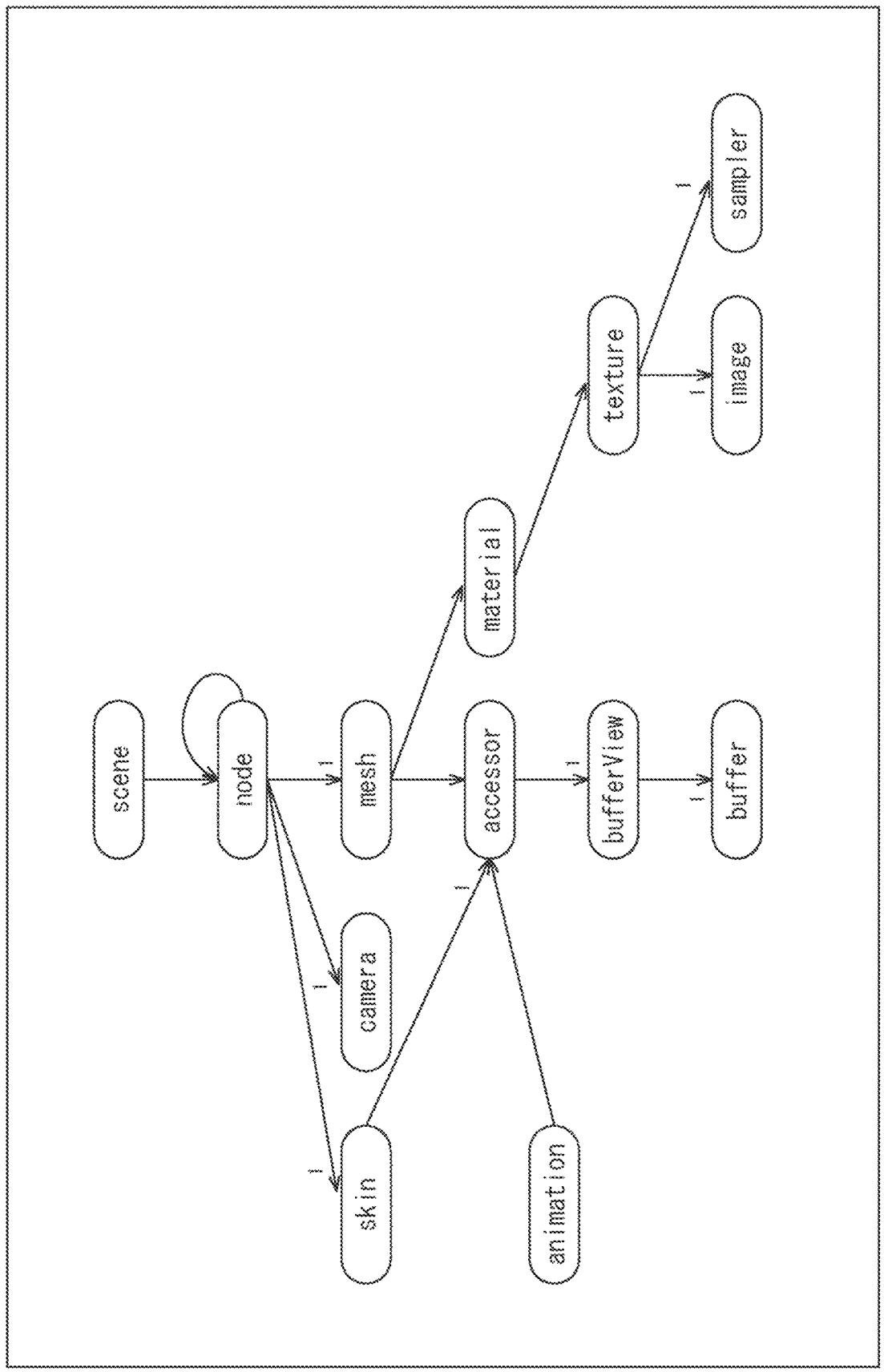
FIG. 2 is a diagram illustrating an example of a glTF object and a reference relationship.

FIG. 2 illustrates glTF objects that can be described at the top of the JSON format file and a reference relationship of the glTF objects. Long circles in the tree structure illustrated in FIG. 2 indicate objects, and an arrow between the objects indicate a reference relationship. As illustrated in FIG. 2, objects such as "scene", "node", "mesh", "camera", "skin", "material", and "texture" are described at the top of the JSON format file.

A description example of such a JSON format file (scene description) is illustrated in FIG. 3. A JSON format file 20 in FIG. 3 shows a description example of a part of the top. In the JSON format file 20, all the used top level objects 21 are described at the top. The top level objects 21 are the glTF objects illustrated in FIG. 2. Furthermore, in the JSON format file 20, a reference relationship between the objects is shown as indicated by an arrow 22. More specifically, the reference relationship is shown by designating an index of an element in an array of an object to be referred to with the property of a higher-level object.

Figure 4:
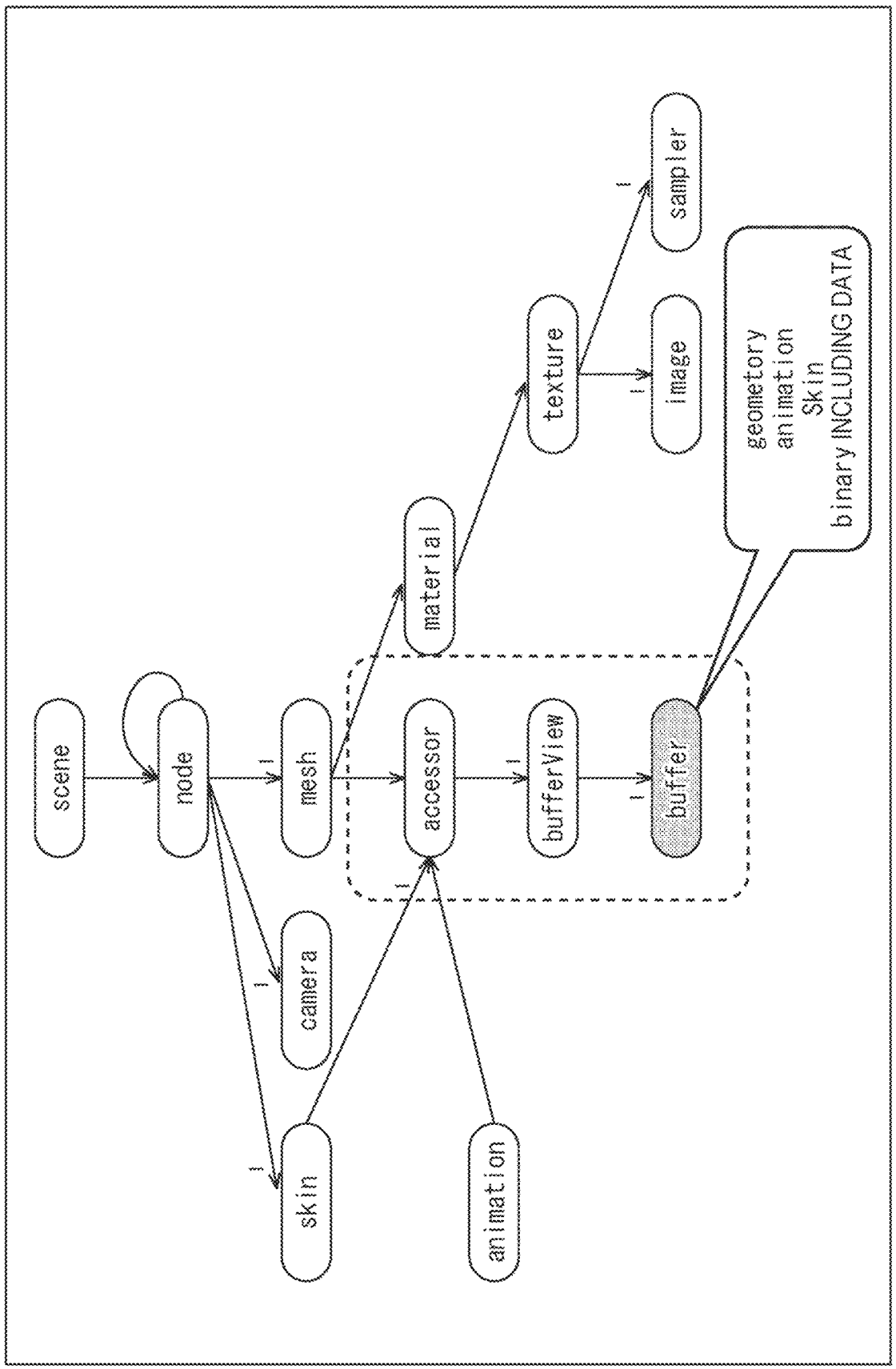
FIG. 4 is a diagram for describing a method of accessing binary data.

FIG. 4 is a diagram for describing a method of accessing binary data. As illustrated in FIG. 4, the binary data is stored in a buffer object. That is, information (for example, a uniform resource identifier (URI) or the like) for accessing the binary data in the buffer object is shown. In the JSON format file, as illustrated in FIG. 4, for example, objects such as a mesh, a camera, and a skin can access the buffer object via an accessor object and a bufferView object.

That is, in an object such as a mesh, a camera, or a skin, an accessor object to be referred to is designated. FIG. 5 illustrates a description example of the mesh object (mesh) in the JSON format file. For example, as illustrated in FIG. 5, in the mesh object, attributes of vertices such as NORMAL, POSITION, TANGENT, and TEXCORD_0 are defined as keys, and an accessor object to be referred to is designated as a value for each attribute.

Figure 6:
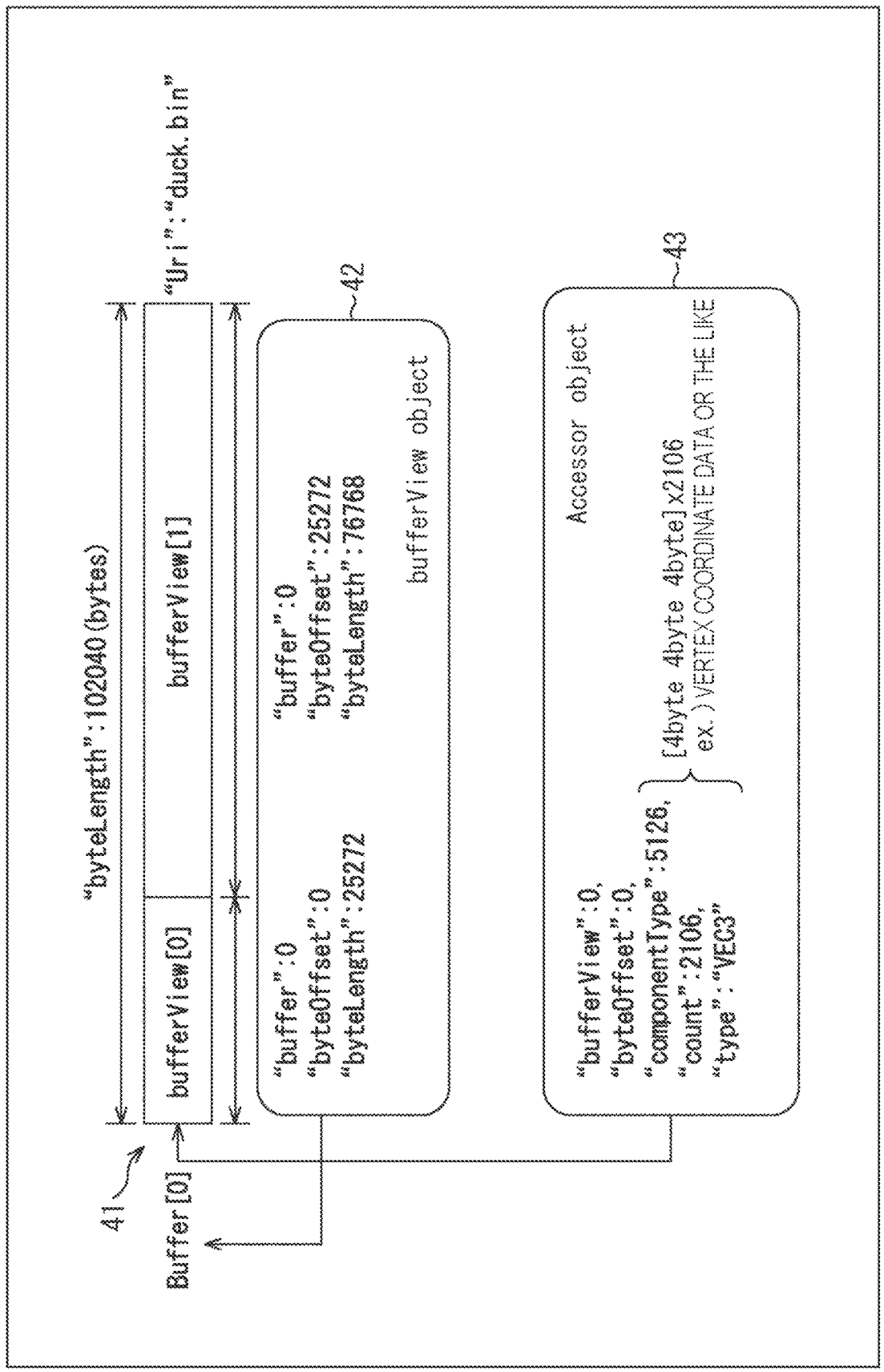
FIG. 6 is a diagram illustrating a relationship among a buffer object, a buffer view object, and an accessor object.

A relationship between the buffer object, the buffer view object, and the accessor object is illustrated in FIG. 6. Furthermore, FIG. 7 illustrates a description example of these objects in the JSON format file.

In FIG. 6, a buffer object 41 is an object that stores information (such as an URI) for accessing binary data that is actual data, and information indicating a data length (for example, byte length) of the binary data. A of FIG. 7 illustrates a description example of the buffer object 41. "bytelength":102040" illustrated in A of FIG. 7 indicates that the byte length of the buffer object 41 is 102040 bytes as illustrated in FIG. 6. Furthermore, "'uri':'duck.bin'" illustrated in A of FIG. 7 indicates that a URI of the buffer object 41 is "duck.bin" as illustrated in FIG. 6.

In FIG. 6, the buffer view object 42 is an object that stores information regarding a subset region of binary data designated in the buffer object 41 (that is, information regarding a partial region of the buffer object 41). B of FIG. 7 illustrates an example description of the buffer view object 42. As illustrated in B of FIG. 6 or 7, the buffer view object 42 stores, for example, information such as identification information of the buffer object 41 to which the buffer view object 42 belongs, an offset (for example, a byte offset) indicating a position of the buffer view object 42 in the buffer object 41, and a length (for example, a byte length) indicating a data length (for example, a byte length) of the buffer view object 42.

As illustrated in B of FIG. 7, in a case where there is a plurality of buffer view objects, information is described for each buffer view object (that is, for each subset region). For example, information such as "'buffer':0", "'bytelength': 25272", and "'byteOffset':0" illustrated on the upper part in B of FIG. 7 is information of the first buffer view object 42 (bufferView[0]) shown in the buffer object 41 in FIG. 6. Furthermore, the information such as "'buffer':0 ',"bytelength':76768", and "'byteOffset':25272" illustrated on the lower side in B of FIG. 7 is information of the second buffer view object 42 (bufferView[1]) shown in the buffer object 41 in FIG. 6.

"'buffer':0" of the first buffer view object 42 (bufferView [0]) illustrated in B of FIG. 7 indicates that the identification information of the buffer object 41 to which the buffer view object 42 (bufferView[0]) belongs is "0" (Buffer[0]) as illustrated in FIG. 6. Furthermore, "'bytelength':25272" indicates that the byte length of the buffer view object 42 (bufferView[0]) is 25272 bytes. Moreover, "'byteOffset':0" indicates that the byte offset of the buffer view object 42 (bufferView[0]) is 0 bytes.

"'buffer':0" of the second buffer view object 42 (buffer-View[1]) illustrated in B of FIG. 7 indicates that the identification information of the buffer object 41 to which the buffer view object 42 (bufferView[0]) belongs is "0" (Buffer [0]) as illustrated in FIG. 6. Furthermore, "bytelength": 76768" indicates that the byte length of the buffer view object 42 (bufferView[0]) is 76768 bytes. Moreover, "'byteOffset':25272" indicates that the byte offset of the buffer view object 42 (bufferView[0]) is 25272 bytes.

In FIG. 6, an accessor object 43 is an object that stores information regarding a method of analyzing data of the buffer view object 42. C of FIG. 7 illustrates a description example of the accessor object 43. As illustrated in C of FIG. 6 or 7, the accessor object 43 stores information such as identification information of the buffer view object 42 to which the accessor object 43 belongs, an offset (for example, byte offset) indicating a position of the buffer view object 42 in the buffer object 41, a component type of the buffer view object 42, the number of pieces of data stored in the buffer view object 42, and the type of data stored in the buffer view object 42, for example. This information is described for each buffer view object.

In the example in C of FIG. 7, information such as "'bufferView':0", "'byteOffset':0", "'componentType': 5126", "'count':2106", and "'type':'VEC3'" is illustrated. "'bufferView':0" indicates that identification information of the buffer view object 42 to which the accessor object 43 belongs is "0" (bufferView[0]), as illustrated in FIG. 6. Furthermore, "'byteOffset':0" indicates that the byte offset of the buffer view object 42 (bufferView[0]) is 0 bytes. Moreover, "'componentType':5126" indicates that the component type is a FLOAT type (OpenGL macro constant). Furthermore, "'count':2106" indicates that the number of pieces of data stored in the buffer view object 42 (buffer-View[0]) is 2106. Moreover, "'type':'VEC3'" indicates that (the type of) the data stored in the buffer view object 42 (bufferView[0]) is a three-dimensional vector.

All accesses to data other than the image are defined by reference to the accessor object 43 (by designating an accessor index).

In glTF 2.0, an object may be extended and a defined new object may be stored in the extension object. FIG. 8 is a diagram for describing an extension method of glTF 2.0. The description example illustrated in FIG. 8 illustrates a description example in a case where a defined new object (CompareDataExtension) is stored in an extension object of the scene object. In the example illustrated in FIG. 8, a new object (CompareDataExtension) is stored in an extension object (extensions) of the scene object ("scenes"). In a case where an object is extended as described above, names of new objects are defined in "extensionUsed" and "extensionRequired". Therefore, it is shown that the new object is an object required for a load.

<Application of Timed Media>

In recent years, for example, as disclosed in Non-Patent Document 2, in Moving Picture Experts Group (MPEG)-I Scene Description, it has been studied to extend glTF 2.0 and to apply timed media as 3D object content. The timed media is media data that changes in the time axis direction like a moving image in a two-dimensional image.

glTF has been applicable only to still image data as media data (3D object content). That is, glTF has not supported media data of a moving image. In the case of moving a 3D object, animation (a method of switching a still image along a time axis) has been applied.

In the MPEG-I Scene Description, it has been studied to apply glTF 2.0, apply a JSON format file as a scene description, and further extend glTF such that timed media (for example, video data) can be handled as media data. In order to handle timed media, for example, the following extension is performed.

Figure 9:
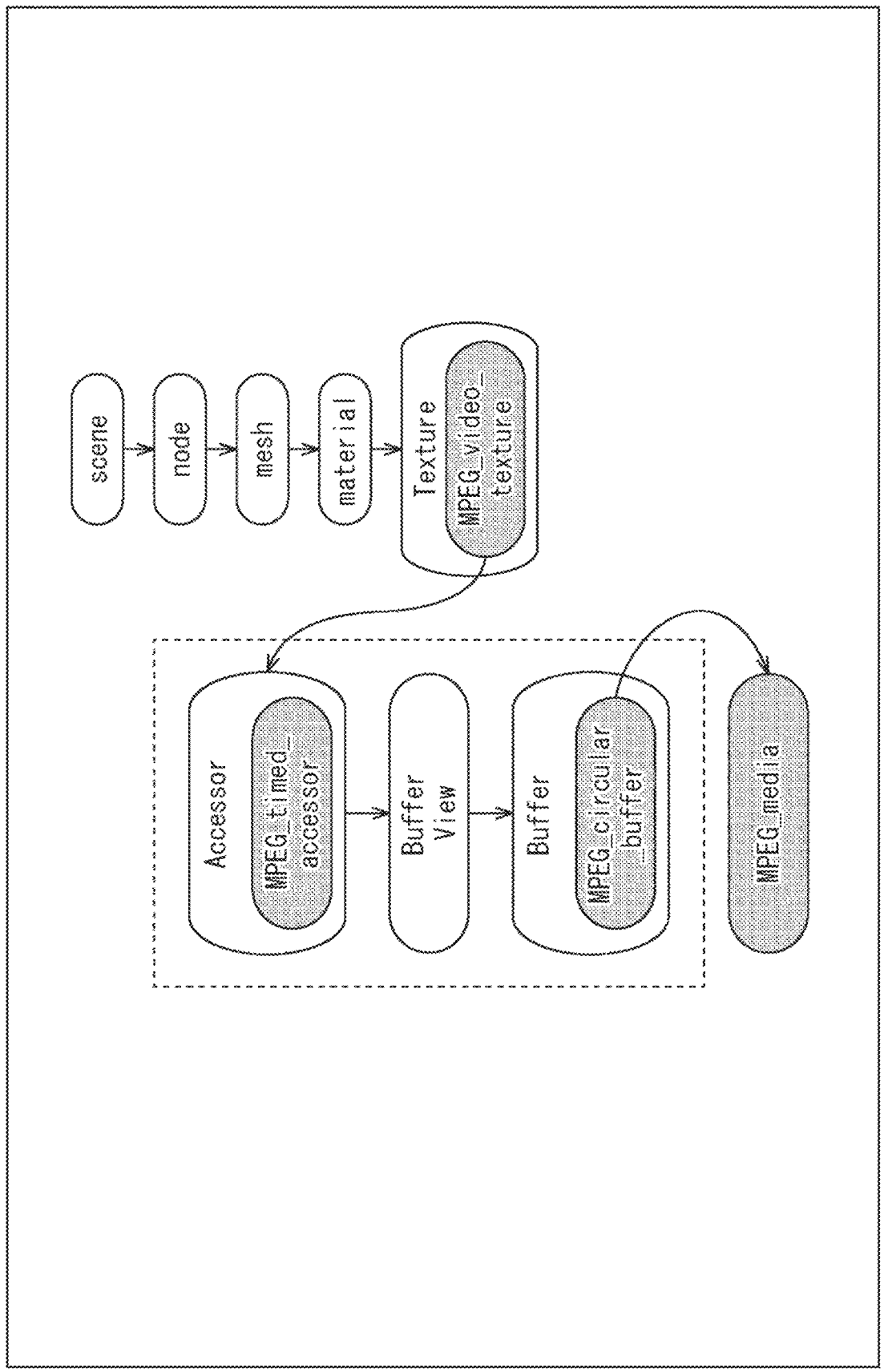
FIG. 9 is a diagram for describing extension for handling timed media.

FIG. 9 is a diagram for describing extension for handling timed media. As illustrated in FIG. 9, an MPEG media object (MPEG_media) that manages actual data such as video data is provided as an extension object (extensions) of a glTF object. That is, information regarding actual data such as video data is stored in the MPEG media object.

Furthermore, as illustrated in FIG. 9, an MPEG video texture object (MPEG_video_texture) is provided as an extension object (extensions) of the texture object (texture). In the MPEG video texture object, information of an accessor corresponding to a buffer object to be accessed is stored. That is, the information of the accessor corresponding to the buffer object in which texture media designated by the MPEG media object (MPEG_media) are decoded and stored is stored in the MPEG video texture object.

FIG. 10 is a diagram illustrating a description example of the MPEG media object (MPEG_media) and the MPEG video texture object (MPEG_video_texture) in a scene description for describing extension for handling timed media. In the example in FIG. 10, in the second line from the top, the MPEG video texture object (MPEG_video_texture) is set as an extension object (extensions) of a texture object (texture) as follows. Then, an index of an accessor ("2" in this example) is designated as a value of the MPEG video texture object.

"texture": [{"sampler":0, "source":1, "extensions": {"MPEG_video_texture": "accessor": 2}}], Furthermore, in the case of the example in FIG. 10, in the seventh to sixteenth lines from the top, the MPEG media object (MPEG_media) is set as an extension object (extensions) of glTF as shown below. Then, as a value of the MPEG media object, for example, various types of information regarding the MPEG media object such as encoding or a URI of the MPEG media object are stored.

"MPEG_media":{
 "media":[
  {"name":"source_1", "renderingRate":30.0,
 "startTime":9.0, "timeOffset":0.0,
  "loop":"true", "controls":"false",
 "startTime":9.0, "timeOffset":0.0,
  "alternatives":[{"mimeType":"video/mp4;codecs=\"avc
1.42E01E\"", "uri":"video1.mp4",
   "tracks":[{"track":"#track_ID=1"}]
  }]
  }
 ]

Furthermore, as illustrated in FIG. 9, an MPEG circular buffer object (MPEG_circular_buffer) is provided as an extension object (extensions) of the buffer object (buffer). Information for dynamically storing data in the buffer object is stored in the MPEG circular buffer object. For example, information such as information indicating a data length of a buffer header (bufferHeader) and information indicating the number of frames is stored in the MPEG circular buffer object. Note that the buffer header stores, for example, information such as an index, a time stamp of stored frame data, or a data length.

Furthermore, as illustrated in FIG. 9, an MPEG timed accessor object (MPEG_timed_accessor) is provided as an extension object (extensions) of the accessor object (accessor). In this case, since the media data is a moving image, the buffer view object (bufferView) to be referred to in the time direction may change (a position may vary). Therefore, information indicating the buffer view object to be referred to is stored in the MPEG timed accessor object. For example, the MPEG timed accessor object stores information indicating a reference to a buffer view object (bufferView) in which a timed accessor information header (timedAccessor information header) is described. Note that the timed accessor information header is, for example, header information that stores information in the accessor object and the buffer view object that dynamically change.

FIG. 11 is a diagram illustrating a description example of the MPEG circular buffer object (MPEG_circular_buffer) and the MPEG timed accessor object (MPEG_timed_accessor) in a scene description for describing extension for handling timed media. In the case of the example in FIG. 11, in the fifth line from the top, the MPEG timed accessor object (MPEG_timed_accessor) is set as an extension object (extensions) of the accessor object (accessors) as follows. Then, parameters such as an index of the buffer view object ("1" in this example), an update rate (updataRate), and invariable information (immutable), and values thereof are designated as values of the MPEG timed accessor object.

"MPEG_timed_accessor":{"bufferView":1, "updateRate":25.0, "immutable":1,"}

Furthermore, in the case of the example in FIG. 11, in the thirteenth line from the top, the MPEG circular buffer object (MPEG_circular_buffer) is set as an extension objects (extensions) of the buffer object (buffer) as follows. Then, parameters such as a buffer frame count (count), a header length (headerLength), and an update rate (updataRate), and values thereof are designated as values of the MPEG circular buffer object.

"MPEG circular buffer":{"count":5, "headerLength":12, "updateRate":25.0}

FIG. 12 is a diagram for describing extension for handling timed media. FIG. 12 illustrates an example of a relationship between the MPEG timed accessor object or the MPEG circular buffer object, and the accessor object, the buffer view object, and the buffer object.

As described above, the MPEG circular buffer object of the buffer object stores information necessary for storing data that changes with time in a buffer region indicated by the buffer object, such as the buffer frame count (count), the header length (headerLength), and the update rate (updataRate). Furthermore, parameters such as an index (idex), a time stamp (timestamp), and a data length (length) are stored in the buffer header (bufferHeader) which is a header of the buffer region.

As described above, the MPEG timed accessor object of the accessor object stores information regarding a buffer view object to be referred to, such as the buffer view object index (bufferView), the update rate (updataRate), and the invariable information (immutable). Furthermore, the MPEG timed accessor object stores information regarding a buffer view object in which the timed accessor information header to be referred to is stored. The timed accessor information header may store a timestamp delta (timestamp_delta), update data for the accessor object, update data for the buffer view object, and the like.

<Method of Associating 3D Object Disposed in Scene with 3D Object Content>

As disclosed in Non-Patent Document 3, audio data is also managed in the MPEG media object similarly to the above-described texture, and is associated via the accessor object, the buffer view object, and the buffer object.

Figure 13:
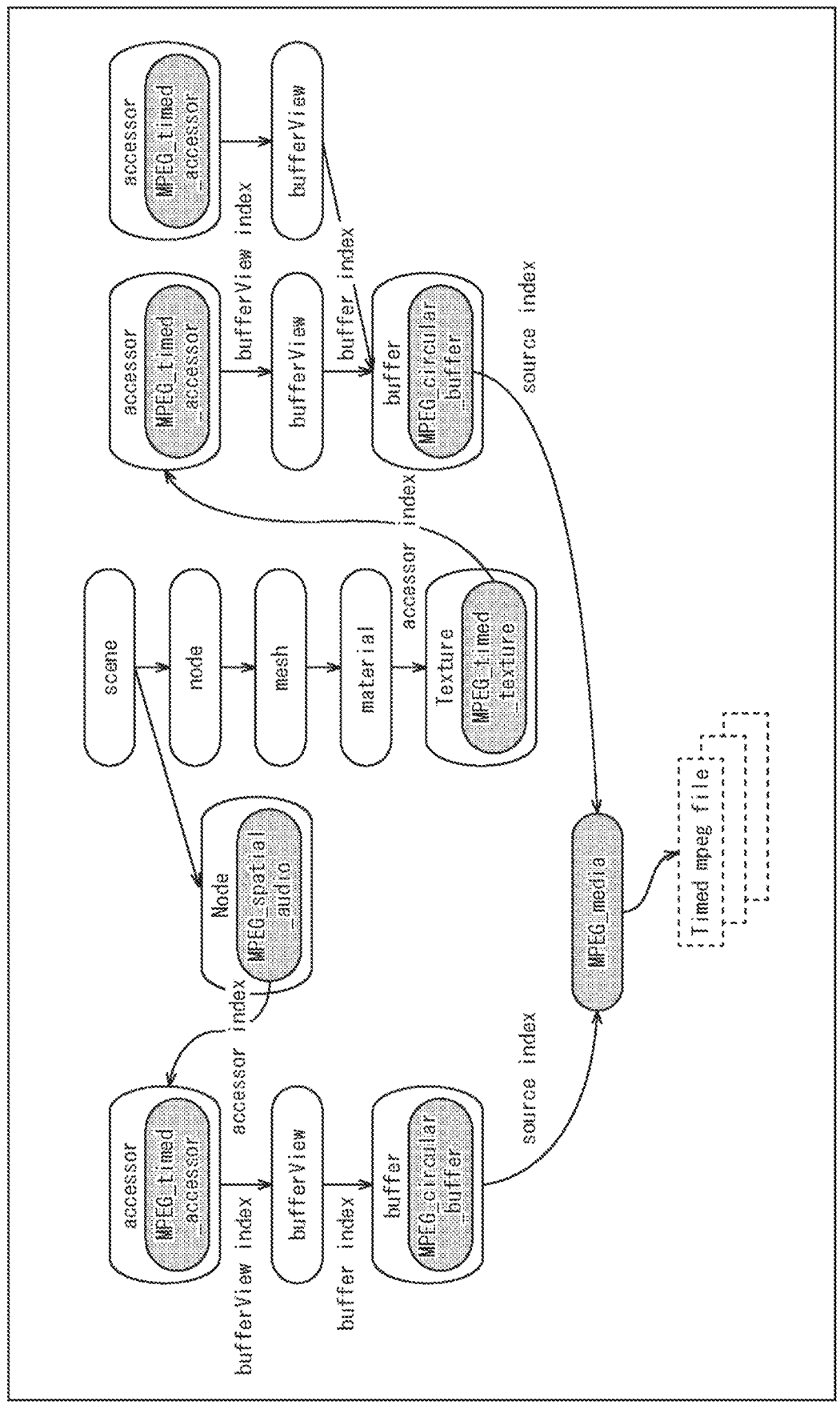
FIG. 13 is a diagram for describing a method of associating 3D object content.

FIG. 13 is a diagram illustrating a method of associating 3D object content. In the case of texture, as illustrated on the right part in FIG. 13, the texture object (texture) is extended such that an MPEG timed texture object (corresponding to the MPEG video texture object in FIG. 9) is provided. Then, in the MPEG timed texture object, an index (accessor index) of the accessor object is used to associate the accessor object that is a reference destination.

The accessor object is extended such that an MPEG timed accessor is provided, an index (bufferView index) of the buffer view object is used to associate the buffer view object that is a reference destination in the MPEG timed accessor. Furthermore, in the buffer view object, an index (buffer index) of the buffer object is used to associate the buffer object that is a reference destination. Then, the buffer object is extended such that an MPEG circular buffer object is provided, and an index (source index) of the MPEG media object (MPEG_media) is used to associate the MPEG media object that is a reference destination.

In contrast, in the case of audio data, as illustrated on the left part in FIG. 13, a node object (Node) is extended such that an MPEG spatial audio object (corresponding to the MPEG video texture object in FIG. 9) is provided. Then, in the MPEG spatial audio object, an index (accessor index) of the accessor object is used to associate the accessor object that is a reference destination.

The accessor object is extended such that an MPEG timed accessor is provided, an index (bufferView index) of the buffer view object is used to associate the buffer view object that is a reference destination in the MPEG timed accessor. Furthermore, in the buffer view object, an index (buffer index) of the buffer object is used to associate the buffer object that is a reference destination. Then, the buffer object is extended such that an MPEG circular buffer object is provided, and an index (source index) of the MPEG media object (MPEG_media) is used to associate the MPEG media object that is a reference destination.

Therefore, the association of the 3D object disposed in the scene with the 3D object content is performed as follows.

1. Uri and track of a file in media [ ] are listed in (an extension object of) the MPEG media object (MPEG_media extension). FIG. 14 is a diagram illustrating a description example of the MPEG media object (MPEG_media) in a scene description. Information regarding media including a URI, a track, and the like is described in the fifth to tenth lines from the top in FIG. 14.

2. An element ID (source index) of a media array is referred to from the MPEG circular buffer object (MPEG_circular_buffer extension), and a medium to be stored in the buffer object (buffer) is designated.

3. The buffer view object (buffer view) for referring to data of each track is designated, and the accessor object (accessor) indicating a method of interpreting the data is further designated.

4. Information regarding reference to an accessor object (accessor) is signaled from the 3D object (texture or audio).

<Method of Designating Plurality of Pieces of Usable 3D Object Content Through Switching>

In the MPEG-I Scene Description, it has been also studied that an encoding method, a profile, a level, or the like of the 3D object content can be switched according to the performance or the like of a client. FIG. 15 is a diagram illustrating a description example of the alternative array of the MPEG media object in a scene description in that case.

As illustrated in FIG. 15, in the MPEG media object, in a case where a plurality of pieces of switchable (selectable) 3D object content is described, the 3D object content is described by using an alternative array. Each element of this alternative array is associated with different pieces of 3D object content. That is, a plurality of pieces of 3D object content is described in a switchable (selectable) manner by the alternative array. For example, in the case in FIG. 15, the 3D object content indicated by an element 91 of the alternative array and the 3D object content indicated by an element 92 are switchable (selectable).

Each element of the alternative array stores information regarding the associated 3D object content. In the case of the example in FIG. 15, information regarding encoding of 3D object content is described as codec information. For example, codec information (codecs=¥ "avc1.42E01E"") is described in the element 91, codec information (codecs=¥ "avc1.64000d¥ "") is described in the element 92.

An apparatus that reproduces 3D object content can select 3D object content to be reproduced from the alternative array described in an MPEG media object on the basis of such information regarding the 3D object content (for example, codec information).

The codec information may include, for example, information such as an encoding method, a profile, and a level of the 3D object content. The apparatus that reproduces 3D object content may select the 3D object content to be reproduced on the basis of the information. For example, the apparatus that reproduces 3D object content may compare performance of the device with the information and select optimal 3D object content as the 3D object content to be reproduced. For example, the apparatus that reproduces 3D object content may select the highest quality 3D object content among pieces of reproducible 3D object content as the 3D object content to be reproduced.

For example, in a case where the 3D object content is stored in an MP4 file and transmitted, the MP4 file that is a transmission target is designated as an element of the alternative array in the MPEG media object. A of FIG. 16 is a diagram illustrating a description example of an MPEG media object (MPEG_media) in a scene description in that case.

As shown in the seventh line and the tenth line from the top, in this case, in the MPEG media object, the codec information of the MP4 file corresponding to each element of the alternative array is shown in a mimeType of the element (codecs=¥ "avc1.42E01E¥ "", codecs= ¥ "avc1.64000d¥ ""). This codec information includes information regarding an encoding method, a profile, and a level of the 3D object content. Therefore, the apparatus that reproduces 3D object content can select and reproduce a reproducible element (3D object content) on the basis of, for example, the performance of the device and the like and this codec information.

In contrast, in a case where the file including the 3D object content is distributed by using Moving Picture Experts Group Dynamic Adaptive Streaming over Hypertext Transfer Protocol (HTTP) (MPEG DASH), not the 3D object content that is a distribution target but a media presentation description (MPD) in which metadata of the 3D object content is stored is designated in the MPEG media object.

However, in this case, information for selecting the 3D object content is not stored in the scene description (Scene Description).

B of FIG. 16 is a diagram illustrating a description example of the MPEG media object (MPEG_media) in the scene description in that case. In this case, as shown in a mimeType and uri on the seventh and eighth or tenth and eleventh lines from the top, the MPD is designated, but codec information of the 3D object content is not described. Therefore, it has been difficult for an apparatus that reproduces 3D object content to select any element (that is, the 3D object content) from the alternative array on the basis of the codec information of the 3D object content.

In other words, in order for the apparatus reproducing 3D object content to select the 3D object content on the basis of the information for selecting the 3D object content, it is necessary to acquire and analyze MPDs of all the elements. For example, the apparatus reproducing 3D object content has needed to perform complicated work such as acquiring and analyzing an MPD of each element, ascertaining codec information of each piece of 3D object content, specifying optimal codec information from the codec information, and acquiring 3D object content corresponding to the codec information. Therefore, there is a possibility that a load of a reproduction process of the 3D object content increases.

2. Transmission of Codecs Information and the Like of Representation

Therefore, in a case where a file including 3D object content is distributed by using MPEG DASH, information (codec information) regarding encoding of representation (Representation) in an adaptation set (Adaptation Set) of the MPD is stored in a scene description (Scene Description) as shown at the top of the table illustrated in FIG. 17.

For example, in an information processing method, a scene description file that describes a scene of 3D object content including information associated with a media presentation description (MPD) that stores metadata of 3D object content distributed by using Moving Picture Experts Group Dynamic Adaptive Streaming over HTTP (MPEG DASH) and information regarding encoding of Representation included in Adaptation Set in the MPD is generated.

For example, an information processing apparatus includes a file generation unit that generates a scene description file that describes a scene of 3D object content including information associated with a media presentation description (MPD) that stores metadata of 3D object content distributed by using Moving Picture Experts Group Dynamic Adaptive Streaming over (HTTP) (MPEG DASH) and information regarding encoding of Representation included in Adaptation Set in the MPD.

As described above, by describing the information regarding the encoding of the representation (Representation) included in the adaptation set (Adaptation Set) in the MPD in the scene description file (scene description) and transmitting the scene description file, an apparatus that reproduces 3D object content can select 3D object content to be reproduced on the basis of the information regarding the encoding. That is, the apparatus that reproduces 3D object content can easily select the 3D object content to be reproduced on the basis of the information regarding the encoding described in the scene description without needing to perform complicated work such as acquiring and analyzing the MPDs of all the elements of the alternative array described in the scene description. Therefore, an increase in the load of the reproduction process can be suppressed.

For example, in an information processing method, a scene description file that describes a scene of 3D object content including information associated with a media presentation description (MPD) that stores metadata of 3D object content distributed by using Moving Picture Experts Group Dynamic Adaptive Streaming over (HTTP) (MPEG DASH) is analyzed, 3D object content to be decoded is selected on the basis of information included in the scene description file and regarding encoding of Representation included in Adaptation Set in the MPD, and encoded data of the selected 3D object content is decoded.

For example, an information processing apparatus includes: a selection unit that analyzes a scene description file that describes a scene of 3D object content including information associated with a media presentation description (MPD) that stores metadata of 3D object content distributed by using Moving Picture Experts Group Dynamic Adaptive Streaming over (HTTP) (MPEG DASH), and selects 3D object content to be decoded on the basis of information included in the scene description file and regarding encoding of Representation included in Adaptation Set in the MPD; and a decoding unit that decodes encoded data of the 3D object content selected by the selection unit.

As described above, the apparatus that reproduces 3D object content can easily select the 3D object content to be reproduced on the basis of the information regarding encoding described in the scene description without needing to perform complicated work such as acquiring and analyzing the MPDs of all the elements of the alternative array described in the scene description file (scene description). Therefore, an increase in the load of the reproduction process can be suppressed.

The information regarding the encoding (codec information) may be stored in a track (tracks) array of each element of the alternative array of (the extension object of) (MPEG_media extension) the MPEG media object. Then, in a case where the 3D object content is reproduced, the 3D object content to be decoded may be selected from the alternative array on the basis of the information (codec information) regarding the encoding stored in the track (tracks) array of each element of the alternative array of (the extension object of) the MPEG media object in the scene description file.

As described above, a flow of the reproduction process can be similar to a case of transmitting the MP4 file including the 3D object content. As described above, it is not necessary to change a processing flow between the case of distributing the 3D object file by using MPEG DASH and the case of transmitting the MP4 file including the 3D object content, and it is possible to suppress an increase in the mounting cost of an apparatus that reproduces 3D object content.

Note that the codec information may have any contents as long as the codec information includes information regarding encoding. For example, the codec information may include information regarding an encoding method, a profile, and a level applied to encoding of a representation. Then, in a case where the 3D object content is reproduced, the 3D object content to be decoded may be selected on the basis of the information regarding the encoding method, the profile, and the level. Of course, the codec information may include some of these pieces of information or may include other pieces of information.

As described above, the apparatus that reproduces 3D object content can select the 3D object content to be decoded on the basis of the information regarding the encoding method, the profile, and the level applied to the encoding of any representation included in the 3D object content (adaptation set), and can thus easily select more appropriate 3D object content. For example, an apparatus that reproduces 3D object content may compare the information applied to each 3D object content with the capability of the device and select reproducible 3D object content.

<Method 1>

For example, as shown in the second row from the top of the table illustrated in FIG. 17, a single piece of codec information may be stored in the track array. That is, one piece of codec information may be stored for each track (Method 1).

FIG. 18 illustrates a description example of the MPEG media object (MPEG_media) of the scene description in that case. In the example in FIG. 18, one piece of codec information is described in the track array (tracks [ ]) of the first element of the alternative array (alternatives [ ]) in the media array (media [ ]) of the MPEG media object (MPEG_media) ("codecs": "avc1.42E01E"). This codec information is codec information of any representation in the adaptation set corresponding to the track of the first element in the alternative array.

Similarly, one piece of codec information is also described in the track array (tracks [ ]) of the second element of the alternative array (alternatives [ ]) ("codecs": "hev1.1.6.L93.B0"). This codec information is codec information of any representation in the adaptation set corresponding to the track of the second element of the alternative array.

As described above, the codec information of any representation in the adaptation set corresponding to the track is stored in the track array of each element of the alternative array. As described above, an apparatus that reproduces 3D object content can select 3D object content to be decoded on the basis of the codec information of any representation included in the 3D object content (adaptation set), and can thus easily select more appropriate 3D object content. For example, an apparatus that reproduces 3D object content may compare the codec information of each piece of 3D object content with the capability of the device and select reproducible 3D object content.

One piece of codec information stored in this track array may be, for example, codec information common to all representations in the adaptation set. That is, the codec information of all the representations included in the adaptation set may be the same, and the codec information indicated in the track array may be applicable to all the representations included in the adaptation set.

Furthermore, the codec information may include codec information of a representation having the highest encoding quality (that is, the maximum value) or codec information of a representation having the lowest encoding quality (that is, the minimum value) among all the representations included in the corresponding adaptation set. Then, in a case where the 3D object content is reproduced, the 3D object content to be decoded may be selected on the basis of the codec information (for example, information regarding an encoding method, a profile, and a level) of the maximum value or the minimum value.

The maximum value and the minimum value of the codec information are feely defined. For example, in the codec information, parameters such as a bit depth and a chroma format are shown as the profile, and parameters such as a resolution and a frame rate are shown as the level. In such a case, the maximum value of the codec information may indicate the maximum value of the parameter of the profile or the level, and the minimum value of the codec information may indicate the minimum value of the parameter of the profile or the level.

For example, in a case where the maximum value of codec information (codec information with the highest quality of encoding) is shown in each element of the alternative array, the apparatus that reproduces 3D object content can easily ascertain sufficient performance for reproducing the adaptation set (3D object content). For example, an apparatus that reproduces 3D object content can reproduce all of adaptation sets (3D object content) in a case where the capability of the device is more than the maximum value, that is, in a case where the representation corresponding to the maximum value can be reproduced. The apparatus that reproduces 3D object content can easily ascertain such a situation on the basis of the maximum value of the codec information shown in the MPEG media object. For example, the apparatus that reproduces 3D object content can reproduce the selected 3D object content more reliably by selecting the 3D object content in which the capability of the device is more than the maximum value of the codec information.

Furthermore, for example, in a case where the minimum value of the codec information (codec information with the lowest encoding quality) is shown in each element of the alternative array, the apparatus that reproduces 3D object content can easily ascertain the performance required for reproducing the adaptation set (3D object content). For example, in a case where an apparatus that reproduces 3D object content has the capability of the device less than the minimum value, that is, in a case where the representation corresponding to the minimum value cannot be reproduced, any representation in the adaptation set cannot be reproduced. The apparatus that reproduces 3D object content can easily ascertain such a situation on the basis of the minimum value of the codec information indicated in the MPEG media object. For example, the apparatus that reproduces 3D object content can more easily select the reproducible 3D object content by excluding the 3D object content in which the capability of the device is less than the minimum value of the codec information from candidates and selecting 3D object content to be reproduced from among candidates that have not been excluded.

Note that either the maximum value or the minimum value of the codec information may be shown in the scene description. In this case, flag information indicating whether the shown codec information is the maximum value or the minimum value may be transmitted. Furthermore, codec information of any representation may be shown. In that case, information indicating which representation of codec information the shown codec information is may be transmitted.

<Storage of MPEG DASH Profile Information>

In the above description, the codec information of the representation has been described to be stored in the MPEG media object. However, information regarding a profile (profile) of MPEG DASH may be stored in (the MPEG media object of) the scene description file. Then, in a case where 3D object content is reproduced, 3D object content to be decoded may be selected on the basis of the information regarding the profile of MPEG DASH stored in (the MPEG media object of) the scene description file.

As described above, the apparatus that reproduces 3D object content can easily ascertain the profile of the MPEG DASH applied to the distribution of the 3D object content.

<Method 1-1>

As shown in the third row from the top of the table illustrated in FIG. 17, information regarding a profile (profile) of MPEG DASH may be stored in a mimeType of each element of the alternative array (Method 1-1).

For example, the information regarding the profile of MPEG DASH may be stored in the mimeType of each element of the alternative array of the MPEG media object in the scene description file. Then, in a case where the 3D object content is reproduced, the 3D object content to be decoded may be selected on the basis of the information regarding the profile of MPEG DASH stored in the mimeType of each element of the alternative array of the MPEG media object in the scene description file.

FIG. 19 is a diagram illustrating a description example of the MPEG media object (MPEG_media) of the scene description in that case. In the example in FIG. 19, in each element of the alternative array (alternatives [ ]) in the media array (media [ ]) of the MPEG media object (MPEG_media), the information regarding the profile of MPEG DASH is further described in addition to the above codec information.

More specifically, the information regarding the profile of MPEG DASH is described in a mimeType of each element of the alternative array. For example, the information regarding the profile of MPEG DASH (profiles: "urn:mpeg:dash:profile:isoff-live:2011") is described in the mimeType of each element of the alternative array.

As described above, the apparatus that reproduces 3D object content can easily ascertain the profile of the MPEG DASH applied to the distribution of the 3D object content.

<Commonalization of Processing Flow>

A of FIG. 16 illustrates a description example of the MPEG media object (MPEG_media) of the scene description in a case where the MP4 file including the 3D object content is transferred. In this example, codec information for each element of the alternative array is shown in mimeType. However, this is an example, and a description manner is not limited to this example. For example, codec information may be stored in a track array of each element of the alternative array.

FIG. 20 is a diagram illustrating a description example of the MPEG media object (MPEG_media) of the scene description in that case. In the example in FIG. 20, the codec information of the representation included in the adaptation set of each element of the alternative array is stored in the track array of the element (("codecs": "avc1.42E01E") on the ninth line from the top, and ("codecs": "hev1.1.6.L93.B0") on the twelfth line from the top).

As described above, the codec information can be stored at a position similar to that in the case where the file including the 3D object content is distributed by using MPEG DASH as illustrated in FIGS. 18 and 19. Therefore, the apparatus that reproduces 3D object content can ascertain the codec information through a similar processing flow in a case where the MP4 file including the 3D object content is transferred and a case where the file including the 3D object content is distributed by using MPEG DASH. That is, it is not necessary to prepare a plurality of processing flows in preparation for each case (the processing flows can be made common). Therefore, it is possible to suppress an increase in the mounting cost of the apparatus that reproduces 3D object content.

<Method 1-2>

As shown in the fourth row from the top of the table illustrated in FIG. 17, a profile alternative array (profile_alternatives [ ]) may be provided in the media array (media [ ]) of the MPEG media object (MPEG_media), and the information regarding the profile (profile) of MPEG DASH may be stored in the mimeType of each element of the profile alternative array (Method 1-2). That is, in a case where the information regarding the profile of MPEG DASH is common to a plurality of elements (tracks) of the alternative array, the information may be collectively described.

For example, the information regarding the profile of MPEG DASH may be stored in a mimeType of each element of the profile alternative array of the MPEG media object of the scene description file. Then, in a case where the 3D object content is reproduced, the 3D object content to be decoded may be selected on the basis of the information regarding the profile of MPEG DASH stored in the mimeType of each element of the profile alternative array of the MPEG media object in the scene description file.

FIG. 21 is a diagram illustrating a description example of the MPEG media object (MPEG_media) of the scene description in that case. In the example in FIG. 21, a profile alternative array (profile_alternatives [ ]) is provided in the media array (media [ ]) of the MPEG media object (MPEG_media). In each element of the profile alternative array, an alternative array in which each element corresponds to the adaptation set is stored. Then, the mimeType is also shown for each element (that is, outside of the alternative array) of the profile alternative array.

Then, information regarding the profile of MPEG DASH is stored in the mimeType. For example, in the mimeType on the eighth line from the top in FIG. 21, (profiles: "urn:mpeg:dash:profile:isoff-on-demand:2011") is described as the profile information. Furthermore, in the mimeType on the sixteenth line from the top in FIG. 21 (profiles: "urn:mpeg:dash:profile:isoff-live:2011") is described as the profile information.

With such a configuration, the number of descriptions of information regarding the profile of MPEG DASH can be reduced. For example, in a case where two types of codec information and two types of information regarding the profile of MPEG DASH are combined, the number of elements of the alternative array becomes four. Therefore, in the case of the description example in FIG. 19, it is necessary to describe four pieces of information regarding the profile of MPEG DASH. In contrast, in the case of the description example in FIG. 21, it is sufficient if two pieces of information regarding the profile of MPEG DASH are described. Therefore, an increase in a data amount of the scene description can be suppressed.

<Method 2>

For example, as shown in the fifth row from the top of the table illustrated in FIG. 17, a plurality of pieces of codec information may be stored in the track array. That is, a plurality of pieces of codec information may be stored for each track (Method 2).

<Method 2-1>

For example, as shown in the sixth row from the top of the table illustrated in FIG. 17, the maximum value and the minimum value of the codec information in the adaptation set may be stored (Method 2-1).

For example, the codec information may include codec information of a representation with the highest quality of encoding (that is, the maximum value) and codec information of a representation with the lowest quality of encoding (that is, the minimum value) among all the representations included in the corresponding adaptation set. That is, both the minimum value and the maximum value of the codec information may be included. Then, in a case where the 3D object content is reproduced, the 3D object content to be decoded may be selected on the basis of the codec information (for example, information regarding an encoding method, a profile, and a level) of the maximum value and the minimum value.

The maximum value and the minimum value of the codec information are feely defined. For example, in the codec information, parameters such as a bit depth and a chroma format are shown as the profile, and parameters such as a resolution and a frame rate are shown as the level. In such a case, the maximum value of the codec information may indicate the maximum value of the parameter of the profile or the level, and the minimum value of the codec information may indicate the minimum value of the parameter of the profile or the level.

FIG. 22 is a diagram illustrating a description example of the MPEG media object (MPEG_media) of the scene description in that case. In the example in FIG. 22, two pieces of codec information are described in the track array of each element of the alternative array of the MPEG media object (MPEG_media). For example, in the track array on the fifteenth line, two pieces of information such as "avc1.42E01E" and "avc1.64000d" are shown as the codec information ("codecs": "avc1.42E01E avc1.64000d"). Furthermore, in the track array on the eighteenth line, two pieces of codec information such as "hev1.1.6.L93.B0" and "hev1.1.6.L153.90" are shown as the codec information ("codecs": "hev1.1.6.L93.B0 hev1.1.6.L153.90").

These two pieces of codec information of each track array indicate the maximum value and the minimum value of the codec information, respectively. With such a description, it is possible to express a width of the quality of the representation included in the adaptation set. That is, in a case where 3D object content is reproduced, the 3D object content to be reproduced can be selected on the basis of the width.

For example, in a case where there is a plurality of decodable tracks (adaptation sets), the 3D object content may be selected on the basis of the width (that is, both the minimum value and the maximum value). Any reference method may be used. For example, 3D object content having the greater minimum value may be selected. Furthermore, 3D object content having the greater maximum value may be selected. Furthermore, 3D object content may be selected according to a position of the capability in the width (for example, to which of the maximum value and the minimum value is closer). Of course, other methods may be used. Furthermore, the apparatus that reproduces 3D object content may select and apply any one of a plurality of methods.

In the above-described way, a possibility that more appropriate 3D object content can be selected may be increased compared with the case of Method 1 in which a single piece of codec information is stored in the track array.

Note that, in the example in FIG. 22, the minimum value and the maximum value of the codec information are separated by a space, but a method of separating the minimum value and the maximum value may be freely selected and is not limited to this example. For example, other symbols such as colons may be used to separate the minimum value from the maximum value. Furthermore, a dedicated property may be provided for each of the maximum value and the minimum value, and the maximum value or the minimum value may be shown in each property.

<Method 2-2>

For example, as shown at the bottom of the table illustrated in FIG. 17, codec information of all representations included in the adaptation set may be stored (Method 2-2).

For example, the codec information may include codec information of a representation having the highest quality of encoding among all the representations included in the corresponding adaptation set. Then, in a case where 3D object content is reproduced, 3D object content to be decoded may be selected on the basis of all pieces of codec information (for example, information regarding an encoding method, a profile, and a level).

FIG. 23 is a diagram illustrating a description example of the MPEG media object (MPEG_media) of the scene description in that case. In the example in FIG. 23, the codec information of all the representations included in the adaptation set is described in the track array of each element of the alternative array of the MPEG media object (MPEG_media). For example, in the track array on fifteenth line, three pieces of information such as "avc1.42E01E", "avc1.640028", and "avc1.640030" are shown as the codec information ("codecs": "avc1.42E01E avc1.640028 avc1.640030"). Furthermore, in the track array on the eighteenth line, three pieces of information such as "hev1.1.6.L93.B0", "hev1.1.6.L120.90", and "hev1.1.6.L153.90" are shown as the codec information ("codecs": "hev1.1.6.L93.B0 hev1.1.6.L120.90 hev1.1.6.L153.90").

That is, the codec information of all representations included in the adaptation set is described in each track array. With such a description, it is possible to express the quality of all the representations included in the adaptation set. That is, it is possible to easily ascertain whether or not each representation can be reproduced.

A method of selecting the 3D object content based on the codec information of all such representations may be freely selected. For example, in a case where there are a plurality of reproducible tracks (adaptation sets), the 3D object content having more (or less) reproducible representations may be selected. Furthermore, the 3D object content having the higher (or lower) average value of the codec information of each representation may be selected. Of course, other methods may be used. Furthermore, the apparatus that reproduces 3D object content may select and apply any one of a plurality of methods.

In the above-described way, a possibility that more appropriate 3D object content can be selected may be increased compared with the case of Method 1 in which a single piece of codec information is stored in the track array.

Note that, in the example in FIG. 22, the minimum value and the maximum value of the codec information are separated by a space, but a method of separating the minimum value and the maximum value may be freely selected and is not limited to this example. For example, other symbols such as colons may be used to separate the minimum value from the maximum value. Furthermore, a dedicated property may be provided for each of the maximum value and the minimum value, and the maximum value or the minimum value may be shown in each property.

Note that, in FIG. 23, three pieces of codec information are shown in each track array, but the number of pieces of codec information depends on the number of representations included in the adaptation set and is not limited to the example in FIG. 23.

Furthermore, in the example in FIG. 23, each piece of codec information is separated by a space, but a method of separating the codec information may be freely selected and is not limited to this example. For example, other symbols such as a colon may be used to separate the codec information.

<Combination>

Note that the respective methods of the present technology described above can be applied in any combination as long as there is no contradiction. For example, in <Method 2> (Method <2-1> and Method <2-2>), an example of applying <Method 1-1> has been described. That is, the information regarding the profile (profile) of MPEG DASH has been described to be stored in the mimeType of each element of the alternative array. However, also in the case of <Method 2> (Method <2-1> and Method <2-2>), the description of <Method 2> (Method <2-1> and Method <2-2>) may be omitted as in the example in FIG. 18. Furthermore, also in case of <Method 2> (Method <2-1> and Method <2-2>), as in <Method 1-2> (as in the example in FIG. 21), a profile alternative array (profile_alternatives [ ]) may be provided in the media array (media [ ]) of the MPEG media object (MPEG_media), and information regarding a profile (profile) of MPEG DASH may be stored in a mimeType of each element of the profile alternative array.

3. First Embodiment

<File Generation Apparatus>

Figure 24:
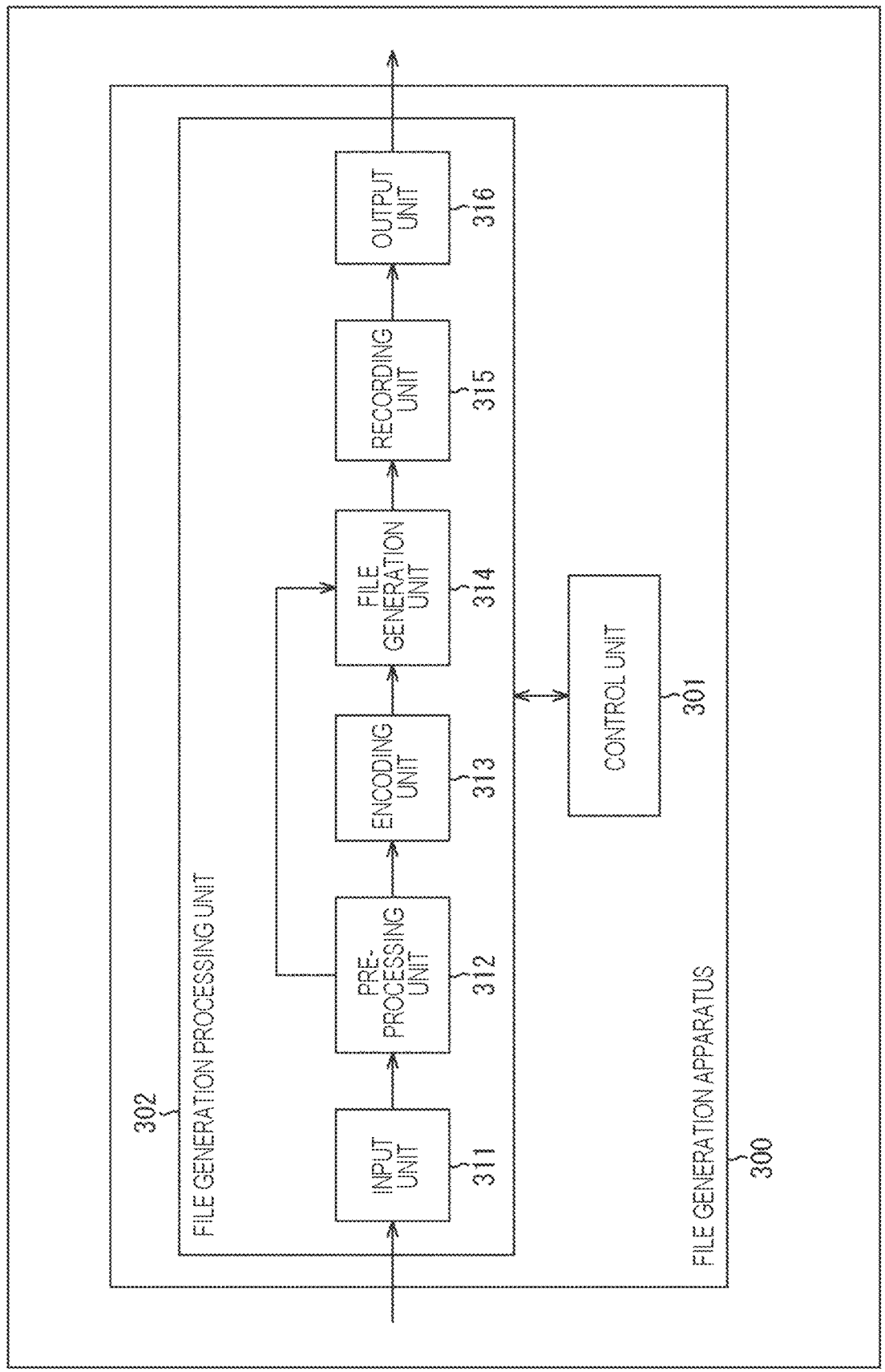
FIG. 24 is a block diagram illustrating a main configuration example of a file generation apparatus.

Each method of the present technology described above can be applied to any device. FIG. 24 is a block diagram illustrating an example of a configuration of a file generation apparatus which is an aspect of an information processing apparatus to which the present technology is applied. A file generation apparatus 300 illustrated in FIG. 24 is an apparatus that generates information for distribution of 3D object content. For example, the file generation apparatus 300 generates a 3D object content file to be distributed by using MPEG DASH or an MPD thereof, and generates a scene description file (scene description) of the 3D object content.

Note that, in FIG. 24, main processing units, data flows, and the like are illustrated, and those illustrated in FIG. 24 are not necessarily all. That is, in the file generation apparatus 300, there may be a processing unit not illustrated as a block in FIG. 24, or there may be processing or a data flow not illustrated as an arrow or the like in FIG. 24.

As illustrated in FIG. 24, the file generation apparatus 300 includes a control unit 301 and a file generation processing unit 302. The control unit 301 controls the file generation processing unit 302. The file generation processing unit 302 is controlled by the control unit 301 and performs processing related to file generation. For example, the file generation processing unit 302 generates a 3D object content file to be distributed by using MPEG DASH or an MPD thereof. Furthermore, the file generation processing unit 302 generates a scene description file corresponding to the 3D object content file. The file generation processing unit 302 outputs the generated file to the outside of the file generation apparatus 300.

The file generation processing unit 302 includes an input unit 311, a pre-processing unit 312, an encoding unit 313, a file generation unit 314, a recording unit 315, and an output unit 316.

The input unit 311 acquires 3D object content and supplies the 3D object content to the pre-processing unit 312. The pre-processing unit 312 extracts information necessary for file generation from the 3D object content. The pre-processing unit 312 supplies the extracted information to the file generation unit 314. Furthermore, the pre-processing unit 312 supplies the 3D object content to the encoding unit 313.

The encoding unit 313 encodes the 3D object content supplied from the pre-processing unit 312, and generates encoded data (bit stream). The encoding unit 313 supplies the encoded data of the generated 3D object content to the file generation unit 314.

The file generation unit 314 acquires the encoded data of the 3D object content supplied from the encoding unit 313. Furthermore, the file generation unit 314 acquires the information supplied from the pre-processing unit 312.

The file generation unit 314 generates a 3D object content file that stores the acquired encoded data of the 3D object content. Furthermore, the file generation unit 314 generates an MPD corresponding to the 3D object content file. The file generation unit 314 executes these processes by appropriately using the information supplied from the pre-processing unit 312. For example, the file generation unit 314 stores the information supplied from the pre-processing unit 312 in the 3D object content file or the MPD.

Furthermore, the file generation unit 314 generates a scene description file corresponding to the generated 3D object content file. In this case, the file generation unit 314 generates the scene description file by applying the present technology described above in <2. Transmission of codecs information or the like of Representation>. The file generation unit 314 can apply any one or more of the methods of the present technology described above in <2. Transmission of codecs information or the like of Representation>.

For example, the file generation unit 314 generates a scene description file including information associated with an MPD that stores metadata of 3D object content distributed by using MPEG DASH and information regarding encoding of a representation included in an adaptation set in the MPD.

In this case, the file generation unit 314 may store the information regarding the encoding in the track array of the alternative array of the MPEG media object (MPEG_media extension) of the scene description file.

Furthermore, the file generation unit 314 may store, in the scene description file, information regarding encoding, including information regarding an encoding method, a profile, and a level applied to encoding of the representation.

Moreover, the file generation unit 314 may store, in the scene description file, information (for example, information regarding an encoding method, a profile, and a level) regarding the encoding of the representation having the highest encoding quality or information (for example, information regarding an encoding method, a profile, and a level) regarding the encoding of the representation having the lowest encoding quality among all the representations included in the adaptation set.

Furthermore, the file generation unit 314 may store, in the scene description file, information (for example, information regarding an encoding method, a profile, and a level) regarding the encoding of the representation having the highest encoding quality and information (for example, information regarding an encoding method, a profile, and a level) regarding the encoding of the representation having the lowest encoding quality among all the representations included in the adaptation set.

Moreover, the file generation unit 314 may store information (for example, information regarding an encoding method, a profile, and a level) regarding encoding of all the representations included in the adaptation set in the scene description file.

Furthermore, the file generation unit 314 may further store information regarding a profile of MPEG DASH in the scene description file.

Moreover, the file generation unit 314 may store the information regarding the MPEG DASH profile in a mimeType of the alternative array of the MPEG media object (MPEG_media extension) of the scene description file.

Furthermore, the file generation unit 314 may store the information regarding the profile of MPEG DASH in a mimeType of the profile alternative array of the MPEG media object (MPEG_media extension) of the scene description file.

The file generation unit 314 supplies the generated file to the recording unit 315. The recording unit 315 includes any recording medium such as a hard disk or a semiconductor memory, and records the file supplied from the file generation unit 314 on the recording medium. Furthermore, the recording unit 315 reads the file recorded on the recording medium in accordance with a request from the control unit 301 or the output unit 316 or at a predetermined timing, and supplies the file to the output unit 316.

The output unit 316 acquires the file supplied from the recording unit 315, and outputs the file to the outside (for example, a distribution server, a reproduction device, or the like) of the file generation apparatus 300.

With such a configuration, the file generation apparatus 300 can describe and transmit the information regarding encoding of the representation included in the adaptation set in the MPD in the scene description file (scene description). Then, the apparatus that reproduces 3D object content can select the 3D object content to be reproduced on the basis of the information regarding the encoding. That is, the apparatus that reproduces 3D object content can easily select the 3D object content to be reproduced on the basis of the information regarding the encoding described in the scene description without needing to perform complicated work such as acquiring and analyzing the MPDs of all the elements of the alternative array described in the scene description. Therefore, an increase in the load of the reproduction process can be suppressed.

<Flow of File Generation Process>

Figure 25:
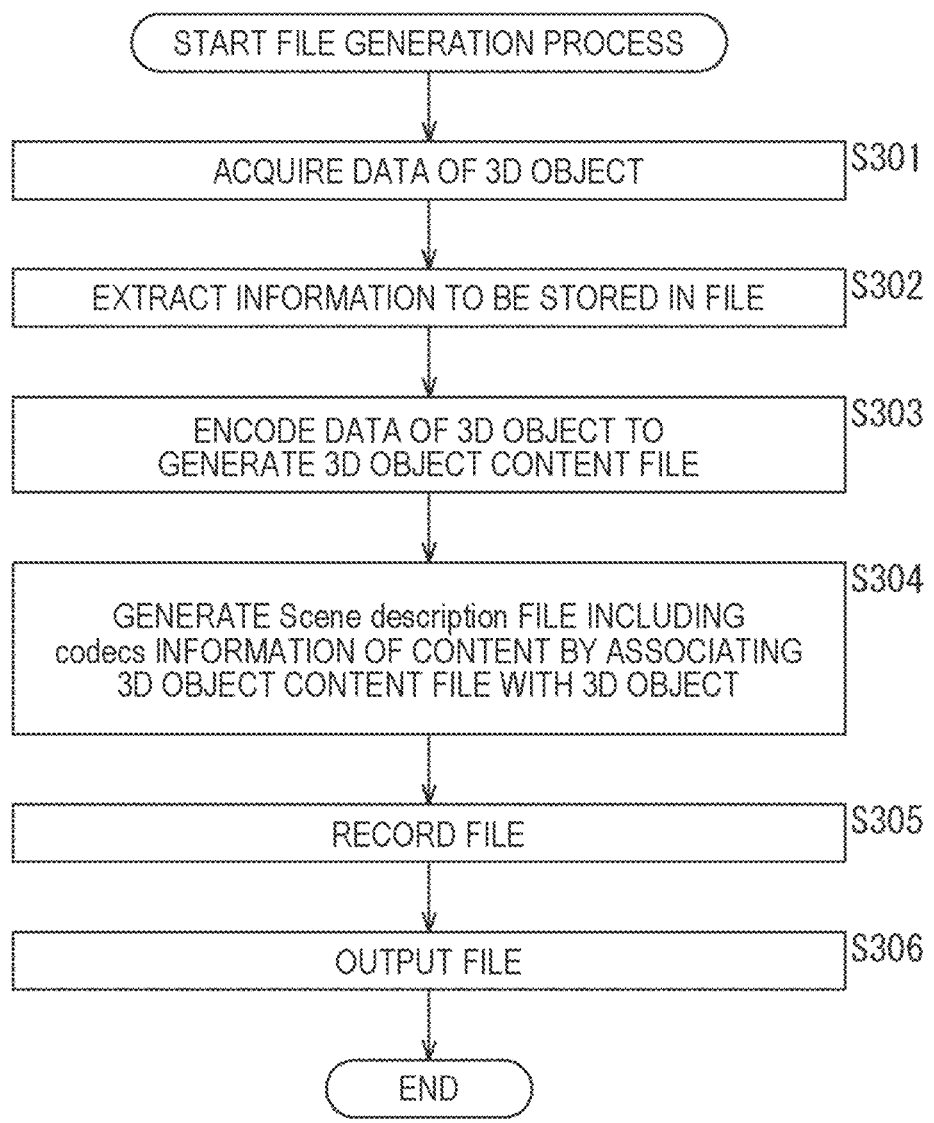
FIG. 25 is a flowchart illustrating an example of a flow of a file generation process.

An example of a flow of a file generation process executed by the file generation apparatus 300 in FIG. 24 will be described with reference to a flowchart of FIG. 25.

In a case where the file generation process is started, the input unit 311 of the file generation apparatus 300 acquires 3D object content which is data of a 3D object in step S301.

In step S302, the pre-processing unit 312 extracts information to be stored in a file from the 3D object content acquired in step S301.

In step S303, the encoding unit 313 encodes the 3D object content acquired in step S301, and generates encoded data of the 3D object content. Then, the file generation unit 314 generates a 3D object content file that stores the encoded data of the 3D object content. In this case, the file generation unit 314 appropriately stores the information extracted in step S302 in the 3D object content file.

Furthermore, the file generation unit 314 generates an MPD corresponding to the 3D object content file.

In step S304, the file generation unit 314 generates a scene description file corresponding to the 3D object content file. In this case, the file generation unit 314 generates the scene description file by applying the present technology described above in <2. Transmission of codecs information or the like of Representation>. The file generation unit 314 can apply any one or more of the methods of the present technology described above in <2. Transmission of codecs information or the like of Representation>.

For example, the file generation unit 314 generates a scene description file including information associated with an MPD that stores metadata of 3D object content distributed by using MPEG DASH and information regarding encoding of a representation included in an adaptation set in the MPD.

In this case, the file generation unit 314 may store the information regarding the encoding in the track array of the alternative array of the MPEG media object (MPEG_media extension) of the scene description file.

Furthermore, the file generation unit 314 may store, in the scene description file, information regarding encoding, including information regarding an encoding method, a profile, and a level applied to encoding of the representation.

Moreover, the file generation unit 314 may store, in the scene description file, information (for example, information regarding an encoding method, a profile, and a level) regarding the encoding of the representation having the highest encoding quality or information (for example, information regarding an encoding method, a profile, and a level) regarding the encoding of the representation having the lowest encoding quality among all the representations included in the adaptation set.

Furthermore, the file generation unit 314 may store, in the scene description file, information (for example, information regarding an encoding method, a profile, and a level) regarding the encoding of the representation having the highest encoding quality and information (for example, information regarding an encoding method, a profile, and a level) regarding the encoding of the representation having the lowest encoding quality among all the representations included in the adaptation set.

Moreover, the file generation unit 314 may store information (for example, information regarding an encoding method, a profile, and a level) regarding encoding of all the representations included in the adaptation set in the scene description file.

Furthermore, the file generation unit 314 may further store information regarding a profile of MPEG DASH in the scene description file.

Moreover, the file generation unit 314 may store the information regarding the MPEG DASH profile in a mimeType of the alternative array of the MPEG media object (MPEG_media extension) of the scene description file.

Furthermore, the file generation unit 314 may store the information regarding the profile of MPEG DASH in a mimeType of the profile alternative array of the MPEG media object (MPEG_media extension) of the scene description file.

In step S305, the recording unit 315 records the file (for example, the 3D object content file, the MPD, and the scene description file) generated in step S304 on the recording medium.

In step S306, the output unit 316 reads the file recorded in step S305 from the recording medium, and outputs the read file to the outside of the file generation apparatus 300 at a predetermined timing.

In a case where the process in step S306 is ended, the file generation process is ended.

As described above, by executing each process, the file generation apparatus 300 can describe and transmit the information regarding the encoding of the representation included in the adaptation set in the MPD in the scene description file (scene description). Then, the apparatus that reproduces 3D object content can select the 3D object content to be reproduced on the basis of the information regarding the encoding. That is, the apparatus that reproduces 3D object content can easily select the 3D object content to be reproduced on the basis of the information regarding the encoding described in the scene description without needing to perform complicated work such as acquiring and analyzing the MPDs of all the elements of the alternative array described in the scene description. Therefore, an increase in the load of the reproduction process can be suppressed.

4. Second Embodiment

<Client Apparatus>

Figure 26:
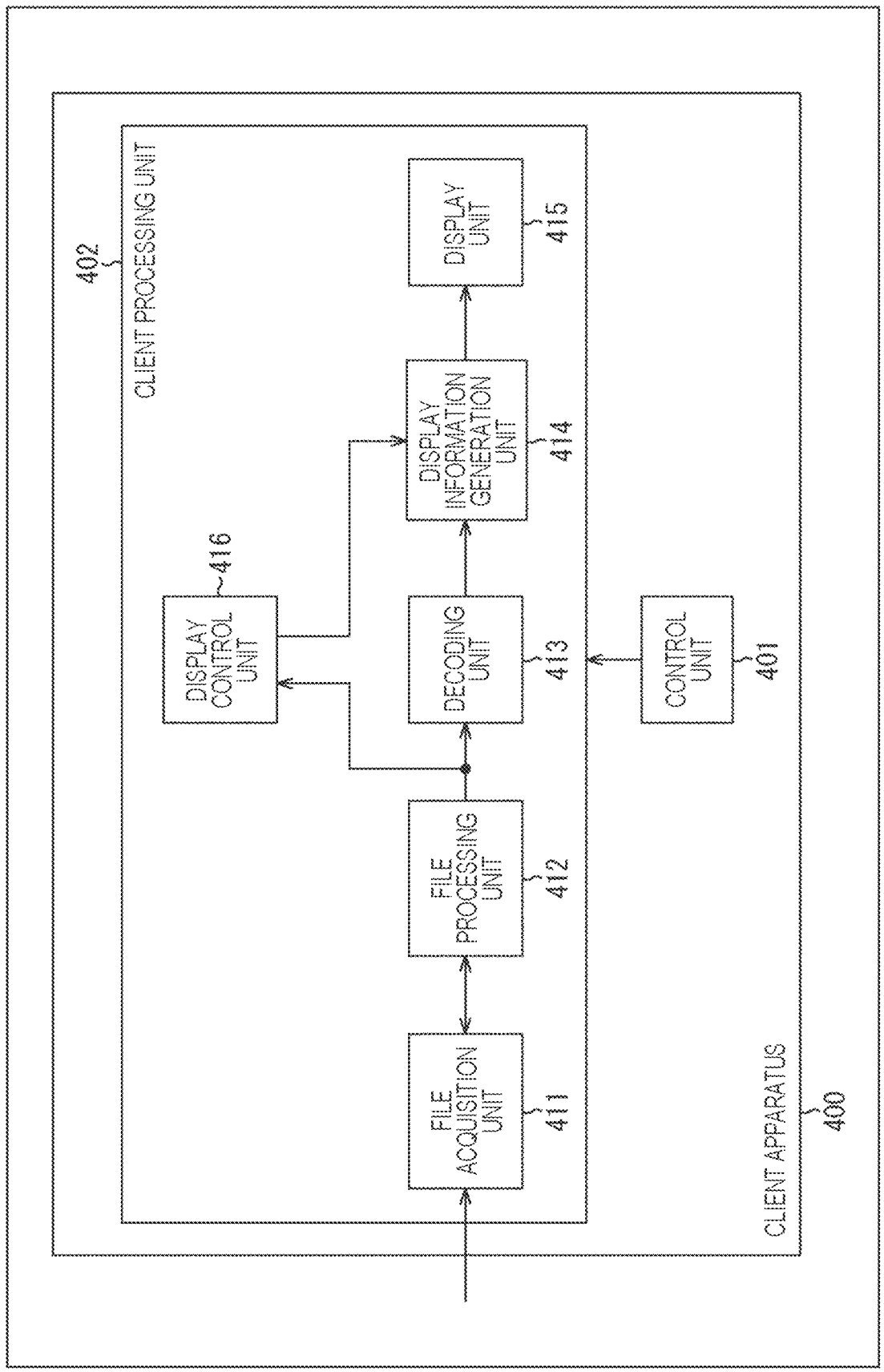
FIG. 26 is a block diagram illustrating a main configuration example of a client apparatus.

FIG. 26 is a block diagram illustrating an example of a configuration of a client apparatus which is an aspect of an information processing apparatus to which the present technology is applied. A client apparatus 400 illustrated in FIG. 26 is a reproduction apparatus that performs a reproduction process of 3D object content on the basis of a scene description file (scene description). For example, the client apparatus 400 reproduces 3D object content generated by the file generation apparatus 300 and stored in the 3D object content file distributed by using MPEG DASH. For example, the client apparatus 400 decodes the encoded data of the 3D object content stored in the 3D object content file on the basis of the scene description file, performs rendering of the generated 3D object content, and generates and displays a display image.

Note that, in FIG. 26, main processing units, data flows, and the like are illustrated, and those illustrated in FIG. 26 are not necessarily all. That is, in the client apparatus 400, there may be a processing unit not illustrated as a block in FIG. 26, or there may be processing or a data flow not illustrated as an arrow or the like in FIG. 26.

As illustrated in FIG. 26, the client apparatus 400 includes a control unit 401 and a reproduction processing unit 402. The control unit 401 performs a process related to control of the reproduction processing unit 402. The reproduction processing unit 402 performs a process related to reproduction of the 3D object content stored in the 3D object content file. For example, the reproduction processing unit 402 is controlled by the control unit 401 and acquires a scene description file from a distribution server (not illustrated) or the like. The reproduction processing unit 402 acquires a 3D object content file storing 3D object content to be reproduced on the basis of the scene description file. Then, the reproduction processing unit 402 performs a reproduction process on the 3D object content stored in the acquired 3D object content file.

The reproduction processing unit 402 includes a file acquisition unit 411, a file processing unit 412, a decoding unit 413, a display information generation unit 414, a display unit 415, and a display control unit 416.

The file acquisition unit 411 acquires, for example, a scene description file supplied from the outside of the client apparatus 400, such as a distribution server or the file generation apparatus 300. The file acquisition unit 411 supplies the acquired scene description file to the file processing unit 412.

Furthermore, the file acquisition unit 411 acquires an MPD corresponding to the 3D object content to be reproduced, a 3D object content file storing the 3D object content, and the like under the control of the file processing unit 412 using the scene description file. This 3D object content file is distributed by using MPEG DASH. The file acquisition unit 411 supplies the acquired files to the file processing unit 412.

The file processing unit 412 acquires the scene description file supplied from the file acquisition unit 411. The file processing unit 412 selects 3D object content to be reproduced on the basis of the acquired scene description file. Then, the file processing unit 412 controls the file acquisition unit 411 to acquire an MPD corresponding to a 3D object content file that stores the selected 3D object content. Then, the file processing unit 412 acquires a 3D object content file storing the selected 3D object content on the basis of the MPD.

In such a process, the file processing unit 412 applies the present technology described above in <2. Transmission of codecs information or the like of Representation>. The file processing unit 412 can apply any one or more methods among the methods of the present technology described above in <2. Transmission of codecs information or the like of Representation>.

For example, the file processing unit 412 analyzes a scene description file including information associated with an MPD that stores metadata of 3D object content distributed by using MPEG DASH, and selects 3D object content to be decoded on the basis of information included in the scene description file and regarding encoding of a representation included in an adaptation set in the MPD.

In this case, the file processing unit 412 may select the 3D object content to be decoded on the basis of the information regarding the encoding stored in the track array of the alternative array of the MPEG media object (MPEG_media extension) of the scene description file.

Furthermore, the file processing unit 412 may select the 3D object content to be decoded on the basis of information regarding an encoding method, a profile, and a level applied to the encoding of the representation, stored in the scene description file.

Moreover, the file processing unit 412 may select the 3D object content to be decoded on the basis of the information regarding the encoding of the representation having the highest encoding quality (for example, information regarding an encoding method, a profile, and a level) or the information regarding the encoding of the representation having the lowest quality (for example, information regarding an encoding method, a profile, and a level) among all the representations included in the adaptation set and stored in the scene description file.

Furthermore, the file processing unit 412 may select the 3D object content to be decoded on the basis of the information regarding the encoding of the representation having the highest encoding quality (for example, information regarding an encoding method, a profile, and a level) and the information regarding the encoding of the representation having the lowest quality (for example, information regarding an encoding method, a profile, and a level) among all the representations included in the adaptation set and stored in the scene description file.

Moreover, the file processing unit 412 may select the 3D object content to be decoded on the basis of the information regarding the encoding of all the representations included in the adaptation set (for example, information regarding an encoding method, a profile, and a level), stored in the scene description file.

Furthermore, the file processing unit 412 may further select the 3D object content to be decoded on the basis of information regarding a profile of MPEG DASH stored in the scene description file.

Moreover, the file processing unit 412 may select the 3D object content to be decoded on the basis of information regarding a profile of MPEG DASH stored in a mimeType of the alternative array of the MPEG media object (MPEG_media extension) of the scene description file.

Furthermore, the file processing unit 412 may select the 3D object content to be decoded on the basis of information regarding a profile of MPEG DASH stored in a mimeType of the profile alternative array of the MPEG media object (MPEG_media extension) of the scene description file.

The file processing unit 412 supplies the 3D object content file acquired as described above to the decoding unit 413 and the display control unit 416.

The decoding unit 413 decodes the encoded data of the 3D object content stored in the 3D object content file supplied from the file processing unit 412. That is, the decoding unit 413 decodes the encoded data of the 3D object content selected by the file processing unit 412. The decoding unit 413 supplies the 3D object content obtained through the decoding to the display information generation unit 414.

The display information generation unit 414 acquires the 3D object content supplied from the decoding unit 413. Furthermore, the display information generation unit 414 acquires control information supplied from the display control unit 416. Then, the display information generation unit 414 generates a display image and the like from the acquired 3D object content according to the control information. The display information generation unit 414 supplies the generated display image and the like to the display unit 415.

The display unit 415 includes a display device, and displays the display image supplied from the display information generation unit 414 by using the display device.

The display control unit 416 acquires information supplied from the file processing unit 412. The display control unit 416 controls the display information generation unit 414 on the basis of the information. The display control unit 416 controls display of the display image by supplying the control information to the display information generation unit 414.

With such a configuration, the client apparatus 400 can easily select the 3D object content to be reproduced on the basis of the information regarding encoding described in the scene description without needing to perform complicated work such as acquiring and analyzing MPDs of all elements of the alternative array described in the scene description file (scene description). Therefore, an increase in the load of the reproduction process can be suppressed.

<Flow of Client Processing>

Figure 27:
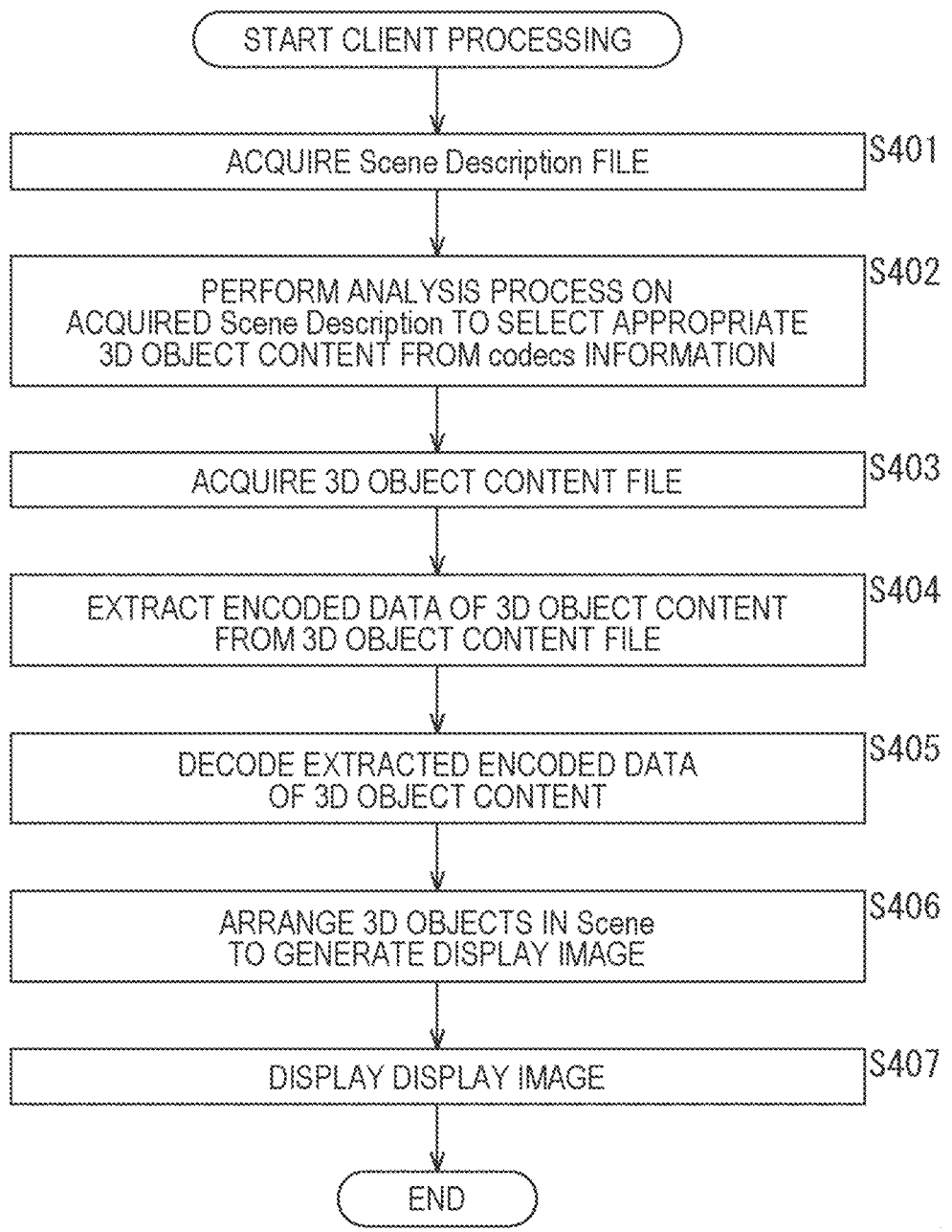
FIG. 27 is a flowchart illustrating an example of a flow of client processing.

An example of a flow of client processing executed by the client apparatus 400 in FIG. 26 will be described with reference to a flowchart of FIG. 27.

In a case where the client processing is started, the file acquisition unit 411 of the client apparatus 400 acquires a scene description file in step S401.

In step S402, the file processing unit 412 analyzes the scene description file acquired in step S401, and selects appropriate 3D object content as a decoding target on the basis of information (codec information) regarding encoding stored in the scene description file. In this case, the file processing unit 412 selects 3D object content by applying the present technology described above in <2. Transmission of codecs information or the like of Representation>. The file processing unit 412 can apply any one or more methods among the methods of the present technology described above in <2. Transmission of codecs information or the like of Representation>.

For example, the file processing unit 412 analyzes a scene description file including information associated with an MPD that stores metadata of 3D object content distributed by using MPEG DASH, and selects 3D object content to be decoded on the basis of information included in the scene description file and regarding encoding of a representation included in an adaptation set in the MPD.

In this case, the file processing unit 412 may select the 3D object content to be decoded on the basis of the information regarding the encoding stored in the track array of the alternative array of the MPEG media object (MPEG_media extension) of the scene description file.

Furthermore, the file processing unit 412 may select the 3D object content to be decoded on the basis of information regarding an encoding method, a profile, and a level applied to the encoding of the representation, stored in the scene description file.

Moreover, the file processing unit 412 may select the 3D object content to be decoded on the basis of the information regarding the encoding of the representation having the highest encoding quality (for example, information regarding an encoding method, a profile, and a level) or the information regarding the encoding of the representation having the lowest quality (for example, information regarding an encoding method, a profile, and a level) among all the representations included in the adaptation set and stored in the scene description file.

Furthermore, the file processing unit 412 may select the 3D object content to be decoded on the basis of the information regarding the encoding of the representation having the highest encoding quality (for example, information regarding an encoding method, a profile, and a level) and the information regarding the encoding of the representation having the lowest quality (for example, information regarding an encoding method, a profile, and a level) among all the representations included in the adaptation set and stored in the scene description file.

Moreover, the file processing unit 412 may select the 3D object content to be decoded on the basis of the information regarding the encoding of all the representations included in the adaptation set (for example, information regarding an encoding method, a profile, and a level), stored in the scene description file.

Furthermore, the file processing unit 412 may further select the 3D object content to be decoded on the basis of information regarding a profile of MPEG DASH stored in the scene description file.

Moreover, the file processing unit 412 may select the 3D object content to be decoded on the basis of information regarding a profile of MPEG DASH stored in a mimeType of the alternative array of the MPEG media object (MPEG_media extension) of the scene description file.

Furthermore, the file processing unit 412 may select the 3D object content to be decoded on the basis of information regarding a profile of MPEG DASH stored in a mimeType of the profile alternative array of the MPEG media object (MPEG_media extension) of the scene description file.

In step S403, the file acquisition unit 411 acquires an MPD corresponding to the 3D object content selected in step S402. Furthermore, the file acquisition unit 411 acquires a 3D object content file that stores the 3D object content selected in step S402 on the basis of the MPD.

In step S404, the file processing unit 412 extracts encoded data of the 3D object content selected in step S402 from the 3D object content file acquired in step S403.

In step S405, the decoding unit 413 decodes the encoded data of the 3D object content extracted in step S404, and generates the 3D object content. That is, the decoding unit 413 decodes the encoded data of the 3D object content selected in step S402.

In step S406, the display information generation unit 414 executes rendering by using the 3D object content generated in step S405. That is, the display information generation unit 414 disposes the 3D object in a scene and generates a display image under the control of the display control unit 416.

In step S407, the display unit 415 uses the display device to display the display image generated in step S406.

In a case where the process of step S407 is ended, the client processing is ended.

As described above, by executing each process, the client apparatus 400 can easily select the 3D object content to be reproduced on the basis of the information regarding encoding described in the scene description without needing to perform complicated work such as acquiring and analyzing MPDs of all elements of the alternative array described in the scene description file (scene description). Therefore, an increase in the load of the reproduction process can be suppressed.

5. Appendix

<Computer>

The above-described series of processes may be executed by hardware or software. In a case where the series of processes is executed by software, a program configuring the software is installed in a computer. Here, the computer includes a computer incorporated in dedicated hardware, for example, a general-purpose personal computer capable of executing various functions by installing various programs, and the like.

Figure 28:
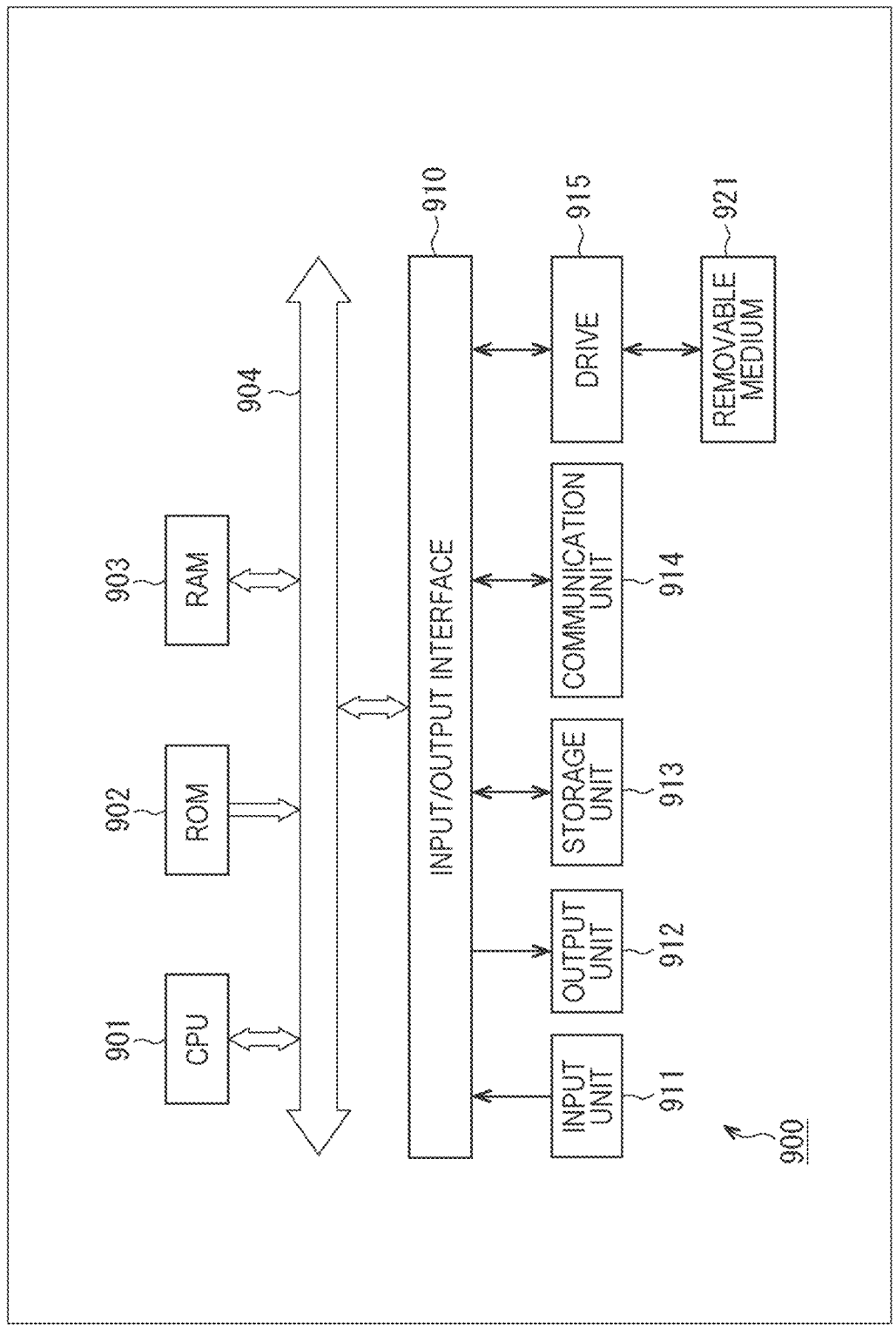
FIG. 28 is a block diagram illustrating a main configuration example of a computer.

FIG. 28 is a block diagram illustrating a configuration example of hardware of a computer that executes the series of processes according to a program.

In a computer 900 illustrated in FIG. 28, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, and an input terminal. The output unit 912 includes, for example, a display, a speaker, an output terminal, and the like. The storage unit 913 includes, for example, a hard disk, a RAM disk, and a nonvolatile memory. The communication unit 914 includes, for example, a network interface. The drive 915 drives a removable medium 921 such as a magnetic disk, an optical disc, a magnetooptical disc, or a semiconductor memory.

In the computer configured as described above, for example, the CPU 901 loads a program stored in the storage unit 913 into the RAM 903 via the input/output interface 910 and the bus 904 and executes the program, and thus the above series of processes is performed. The RAM 903 also appropriately stores data and the like necessary for the CPU 901 to execute various processes.

The program executed by the computer can be applied by being recorded on the removable medium 921 as, for example, a package medium. In this case, the program can be installed in the storage unit 913 via the input/output interface 910 by attaching the removable medium 921 to the drive 915.

Furthermore, this program may also be provided via a wired or wireless transmission medium such as a local area network, the Internet, or digital satellite broadcasting. In this case, the program may be received by the communication unit 914 and installed in the storage unit 913.

Furthermore, this program may be installed in the ROM 902 or the storage unit 913 in advance.

<Target to which Present Technology is Applicable>

The present technology can be applied to any image encoding/decoding method.

Furthermore, the present technology can be applied to any configuration. For example, the present technology can be applied to various electronic apparatuses.

Furthermore, for example, the present technology can also be implemented as a partial configuration of an apparatus, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing in which one function is shared and processed in cooperation by a plurality of devices via a network. For example, the present technology may be implemented in a cloud service that provides a service related to an image (moving image) to any terminal such as a computer, an audio visual (AV) apparatus, a portable information processing terminal, or an Internet of Things (IoT) device.

Note that, in the present specification, a system means a set of a plurality of constituents (devices, modules (parts), and the like), and it does not matter whether or not all the constituents are in the same casing. Therefore, a plurality of devices accommodated in separate casings and connected via a network and one device in which a plurality of modules is accommodated in one casing are both systems.

<Field and Application to which Present Technology is Applicable>

The system, the device, the processing unit, and the like to which the present technology is applied can be used in any fields such as traffic, medical care, crime prevention, agriculture, livestock industry, mining, beauty, factory, home appliance, weather, and natural monitoring. Furthermore, an application thereof is also any application.

For example, the present technology can be applied to a system or a device provided for providing content for appreciation or the like. Furthermore, for example, the present technology can also be applied to a system or a device provided for traffic, such as traffic condition supervision and automated driving control. Furthermore, for example, the present technology can also be applied to a system or a device provided for security. Furthermore, for example, the present technology can be applied to a system or a device provided for automatic control of a machine or the like. Furthermore, for example, the present technology can also be applied to a system or a device provided for agriculture or livestock industry. Furthermore, the present technology can also be applied to a system or a device that monitors natural states such as volcanoes, forests, and oceans, wildlife, and the like. Moreover, for example, the present technology can also be applied to a system or a device provided for sports.

<Others>

Note that, in the present specification, the "flag" is information for identifying a plurality of states, and includes not only information used for identifying two states such as true (1) and false (0) but also information capable of identifying three or more states. Therefore, a value that can be taken by the "flag" may be, for example, a binary of 1/0 or a ternary or more. That is, the number of bits constituting this "flag" may be freely selected, and may be one bit or a plurality of bits. Furthermore, since, for the identification information (including the flag), not only a form in which the identification information is included in a bit stream but also a form in which difference information of the identification information with respect to certain reference information is included in the bit stream is assumed, in the present specification, the "flag" or the "identification information" includes not only the information but also difference information with respect to reference information.

Furthermore, various types of information (metadata and the like) related to encoded data (bit stream) may be transmitted or recorded in any form as long as the information is associated with the encoded data. Here, the term "associate" means, for example, that one data can be used (linked) in a case where the other data is processed. That is, the data associated with each other may be collected as one piece of data or may be individual data. For example, information associated with encoded data (image) may be transmitted on a transmission path different from that of the encoded data (image). Furthermore, for example, the information associated with the encoded data (image) may be recorded on a recording medium (or another recording area of the same recording medium) different from that of the encoded data (image). Note that this "association" may be applied to a part of data instead of the entire data. For example, an image and information corresponding to the image may be associated with each other in any unit such as a plurality of frames, one frame, or a part in a frame.

Note that, in the present specification, terms such as "combine", "multiplex", "add", "integrate", "include", "store", "put into", "plug in", and "insert" mean to combine a plurality of items into one, for example, to combine encoded data and metadata into one data, and mean one method of the above "associate".

Furthermore, the embodiments of the present technology are not limited to the above-described embodiments, and various modifications can be made without departing from the spirit of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configuration may be added to the configuration of each device (or each processing unit). Moreover, as long as a configuration or an operation of the entire system are substantially the same, a part of the configuration of a certain device (or processing unit) may be included in a configuration of another device (or another processing unit).

Furthermore, for example, the above-described program may be executed in any device. In that case, it is sufficient if the device has a necessary function (functional block or the like) and can obtain necessary information.

Furthermore, for example, each step in one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step may also be executed as processes in a plurality of steps. Conversely, the processing described as a plurality of steps may be collectively executed as one step.

Furthermore, for example, in the program executed by the computer, processes in steps for describing the program may be executed in a time series in the order described in the present specification, or may be executed in parallel or individually at a necessary timing such as when a call is made. That is, as long as there is no contradiction, the process in each step may be executed in an order different from the above-described order. Moreover, the processes in the steps for describing this program may be executed in parallel with processes of another program, or may be executed in combination with the processes of another program.

Furthermore, for example, a plurality of techniques related to the present technology can be implemented independently alone as long as there is no contradiction. Of course, a plurality of any present technologies can be implemented in combination. For example, some or all of the present technologies described in any of the embodiments can be implemented in combination with some or all of the present technology described in other embodiments. Furthermore, some or all of any present technologies described above can be implemented in combination with other technologies not described above.

Note that the present technology can also have the following configurations.

(1) An information processing apparatus including:
a file generation unit that generates a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and information regarding encoding of a Representation included in an Adaptation Set in the MPD.

(2) The information processing apparatus according to (1), in which
the scene description file stores the information regarding the encoding in a tracks array of an alternatives array of MPEG_media extension.

(3) The information processing apparatus according to (1) or (2), in which
the information regarding the encoding includes information regarding an encoding method, a profile, and a level applied to encoding of the Representation.

(4) The information processing apparatus according to (3), in which
the information regarding the encoding includes
information regarding the encoding method, the profile, and the level of the Representation of which encoding quality is highest, or information regarding the encoding method, the profile, and the level of the Representation of which the encoding quality is lowest
among all of the Representations included in the Adaptation Set.

(5) The information processing apparatus according to (3), in which
the information regarding the encoding includes
information regarding the encoding method, the profile, and the level of the Representation of which encoding quality is highest, and
information regarding the encoding method, the profile, and the level of the Representation of which the encoding quality is lowest
among all of the Representations included in the Adaptation Set.

(6) The information processing apparatus according to (3), in which
the information regarding the encoding includes information regarding the encoding method, the profile, and the level of all of the Representations included in the Adaptation Set.

(7) The information processing apparatus according to any one of (2) to (6), in which
the scene description file further stores information regarding a profile of the MPEG DASH.

(8) The information processing apparatus according to (7), in which
the scene description file stores the information regarding the profile of the MPEG DASH in a mimetype of the alternatives array of the MPEG_media extension.

(9) The information processing apparatus according to (7), in which
the scene description file stores the information regarding the profile of the MPEG DASH in a mimetype of the profile_alternatives array of the MPEG_media extension.

(10) An information processing method including:
generating a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and information regarding encoding of a Representation included in an Adaptation Set in the MPD.

(11) An information processing apparatus including:
a selection unit that analyze a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and selects the 3D object content to be decoded on the basis of information included in the scene description file and regarding encoding of a Representation included in an Adaptation Set in the MPD; and
a decoding unit that decodes encoded data of the 3D object content selected by the selection unit.

(12) The information processing apparatus according to (11), in which
the selection unit selects the 3D object content to be decoded on the basis of the information regarding the encoding stored in a tracks array of an alternatives array of MPEG media extension of the scene description file.

(13) The information processing apparatus according to (11) or (12), in which
the information regarding the encoding includes information regarding an encoding method, a profile, and a level applied to encoding of the Representation, and
the selection unit selects the 3D object content to be decoded on the basis of the information regarding the encoding method, the profile, and the level.

(14) The information processing apparatus according to (13), in which
the information regarding the encoding includes
information regarding the encoding method, the profile, and the level of the Representation of which encoding quality is highest, or
information regarding the encoding method, the profile, and the level of the Representation of which the encoding quality is lowest
among all of the Representations included in the Adaptation Set, and
the selection unit selects
the 3D object content to be decoded on the basis of
the information regarding the encoding method, the profile, and the level of the Representation of which the encoding quality is highest, or
the information regarding the encoding method, the profile, and the level of the Representation of which the encoding quality is lowest.

(15) The information processing apparatus according to (13), in which
the information regarding the encoding includes
information regarding the encoding method, the profile, and the level of the Representation of which encoding quality is highest, and
information regarding the encoding method, the profile, and the level of the Representation of which the encoding quality is lowest
among all of the Representations included in the Adaptation Set, and
the selection unit selects
the 3D object content to be decoded on the basis of
the information regarding the encoding method, the profile, and the level of the Representation of which the encoding quality is highest, and
the information regarding the encoding method, the profile, and the level of the Representation of which the encoding quality is lowest.

(16) The information processing apparatus according to (13), in which
the information regarding the encoding includes information regarding the encoding method, the profile, and the level of all of the Representations included in the Adaptation Set, and
the selection unit select the 3D object content to be decoded on the basis of the information regarding the encoding method, the profile, and the level of all of the Representations included in the Adaptation Set,

(17) The information processing apparatus according to any one of (12) to (16), in which
the selection unit selects the 3D object content to be decoded further on the basis of information regarding a profile of the MPEG DASH stored in the scene description file.

(18) The information processing apparatus according to (17), in which the selection unit selects the 3D object content to be decoded on the basis of the information regarding the profile of the MPEG DASH stored in a mimetype of the alternatives array of the MPEG media extension of the scene description file.

(19) The information processing apparatus according to (17), in which
the selection unit selects the 3D object content to be decoded on the basis of the information regarding the profile of the MPEG DASH stored in a mimetype of a profile_alternatives array of the MPEG_media extension of the scene description file.

(20) An information processing method including:
analyzing a scene description file that describes a scene of 3D object content, the scene description file including information associated with a media presentation description (MPD) that stores metadata of the 3D object content distributed by using Moving Picture Experts Group Dynamic Adaptive Streaming over HTTP (MPEG DASH), and selecting the 3D object content to be decoded on the basis of information included in the scene description file and regarding encoding of a Representation included in an Adaptation Set in the MPD; and
decoding encoded data of the selected 3D object content.

REFERENCE SIGNS LIST

300 File generation apparatus
301 Control unit
302 File generation processing unit
311 Input unit
312 Pre-processing unit
313 Encoding unit
314 File generation unit
315 Recording unit
316 Output unit
400 Client apparatus
401 Control unit
402 Client processing unit
411 File acquisition unit
412 File processing unit
413 Decoding unit
414 Display information generation unit
415 Display unit
416 Display control unit

The invention claimed is:

1. An information processing apparatus comprising:
processing circuitry configured to generate a scene description file that describes a scene of 3D object content, wherein
the scene description file includes information associated with a media presentation description (MPD) that stores metadata of the 3D object content distributed by using Moving Picture Experts Group Dynamic Adaptive Streaming over HTTP (MPEG DASH),
the scene description file includes codec information for each of a plurality of Representations, each of the Representations being included in an Adaptation Set in the MPD, and
the codec information for each of the Representations, that is included in the scene description file, provides for comparison of the codec information with capability information such that selection of the 3D object content distributed by using the MPEG DASH can be performed without acquiring and analyzing the MPD.

2. The information processing apparatus according to claim 1, wherein the scene description file stores the codec information in a tracks array of an alternatives array of an MPEG media extension.

3. The information processing apparatus according to claim 1, wherein the codec information includes information regarding an encoding method, a profile, and a level applied to encoding of the Representations.

4. The information processing apparatus according to claim 3, wherein
the codec information includes
information regarding the encoding method, the profile, and the level of the Representation of which encoding quality is highest, or
information regarding the encoding method, the profile, and the level of the Representation of which the encoding quality is lowest
among all of the Representations included in the Adaptation Set.

5. The information processing apparatus according to claim 3, wherein
the codec information regarding the encoding includes
information regarding the encoding method, the profile, and the level of the Representation of which encoding quality is highest, and
information regarding the encoding method, the profile, and the level of the Representation of which the encoding quality is lowest
among all of the Representations included in the Adaptation Set.

6. The information processing apparatus according to claim 3, wherein
the codec information includes information regarding the encoding method, the profile, and the level of all of the Representations included in the Adaptation Set.

7. The information processing apparatus according to claim 2, wherein the scene description file further stores information regarding a profile of the MPEG DASH.

8. The information processing apparatus according to claim 7, wherein the scene description file stores the information regarding the profile of the MPEG DASH in a mimetype of the alternatives array of the MPEG_media extension.

9. The information processing apparatus according to claim 7, wherein the scene description file stores the information regarding the profile of the MPEG DASH in a mimetype of a profile_alternatives array of the MPEG media extension.

10. An information processing method comprising:
generating a scene description file that describes a scene of 3D object content, wherein
the scene description file includes information associated with a media presentation description (MPD) that stores metadata of the 3D object content distributed by using Moving Picture Experts Group Dynamic Adaptive Streaming over HTTP (MPEG DASH), and
the scene description file includes codec information for each of a plurality of Representations, each of the Representations being included in an Adaptation Set in the MPD, and
the codec information for each of the Representations, that is included in the scene description file, provides for comparison of the codec information with capability information such that selection of the 3D object content distributed by using the MPEG DASH can be performed without acquiring and analyzing the MPD.

11. An information processing apparatus comprising:
processing circuitry configured to:
analyze a scene description file that describes a scene of 3D object content,
the scene description file including information associated with a media presentation description (MPD) that stores metadata of the 3D object content distributed by using Moving Picture Experts Group Dynamic Adaptive Streaming over HTTP (MPEG DASH), and
the scene description file including codec information for each of a plurality of Representations, each of the Representations being included in an Adaptation Set in the MPD;
compare the codec information from the scene description file with capability information of the information processing apparatus;
select the 3D object content distributed by using the MPEG DASH to be decoded on a basis of the comparison without acquiring the MPD; and
decode encoded data of the selected 3D object content.

12. The information processing apparatus according to claim 11, wherein the codec information is stored in a tracks array of an alternatives array of an MPEG media extension of the scene description file.

13. The information processing apparatus according to claim 11, wherein
the codec information includes information regarding an encoding method, a profile, and a level applied to the encoding of Representations, and
the processing circuitry is configured to select the 3D object content to be decoded on a basis of the information regarding the encoding method, the profile, and the level.

14. The information processing apparatus according to claim 13, wherein
the codec information regarding the encoding includes
information regarding the encoding method, the profile, and the level of the Representation of which encoding quality is highest, or
information regarding the encoding method, the profile, and the level of the Representation of which the encoding quality is lowest
among all of the Representations included in the Adaptation Set, and
the processing circuitry is configured to select the 3D object content to be decoded on the basis of
the information regarding the encoding method, the profile, and the level of the Representation of which the encoding quality is highest, or
the information regarding the encoding method, the profile, and the level of the Representation of which the encoding quality is lowest.

15. The information processing apparatus according to claim 13, wherein
the codec information regarding the encoding includes
information regarding the encoding method, the profile, and the level of the Representation of which encoding quality is highest, and
information regarding the encoding method, the profile, and the level of the Representation of which the encoding quality is lowest
among all of the Representations included in the Adaptation Set, and
the processing circuitry is configured to select the 3D object content to be decoded on the basis of
the information regarding the encoding method, the profile, and the level of the Representation of which the encoding quality is highest, and
the information regarding the encoding method, the profile, and the level of the Representation of which the encoding quality is lowest.

16. The information processing apparatus according to claim 13, wherein
the codec information regarding the encoding includes information regarding the encoding method, the profile, and the level of all of the Representations included in the Adaptation Set, and
the processing circuitry is configured to select the 3D object content to be decoded on the basis of the information regarding the encoding method, the profile, and the level of all of the Representations included in the Adaptation Set.

17. The information processing apparatus according to claim 12, wherein the processing circuitry is configured to select the 3D object content to be decoded further on the basis of information regarding a profile of the MPEG DASH stored in the scene description file.

18. The information processing apparatus according to claim 17, wherein the processing circuitry is configured to select the 3D object content to be decoded on the basis of the information regarding the profile of the MPEG DASH stored in a mimetype of the alternatives array of the MPEG_media extension of the scene description file.

19. The information processing apparatus according to claim 17, wherein the processing circuitry is configured to select the 3D object content to be decoded on the basis of the information regarding the profile of the MPEG DASH stored in a mimetype of a profile_alternatives array of the MPEG_media extension of the scene description file.

20. An information processing method comprising:
analyzing a scene description file that describes a scene of 3D object content,
the scene description file including information associated with a media presentation description (MPD) that stores metadata of the 3D object content distributed by using Moving Picture Experts Group Dynamic Adaptive Streaming over HTTP (MPEG DASH), and
the scene description file including codec information for each of a plurality of Representations, each of the Representations being included in an Adaptation Set in the MPD;
comparing the codec information from the scene description file with capability information of the information processing apparatus;
selecting the 3D object content distributed by using the MPEG DASH to be decoded on a basis of the comparison without acquiring the MPD; and
decoding encoded data of the selected 3D object content.

* * * * *